United States Patent
Multer et al.

(10) Patent No.: US 7,035,878 B1
(45) Date of Patent: Apr. 25, 2006

(54) BASE ROLLING ENGINE FOR DATA TRANSFER AND SYNCHRONIZATION SYSTEM

(75) Inventors: David L. Multer, Santa Cruz, CA (US); Robert E. Garner, Lawrenceville, GA (US); Leighton A. Ridgard, Ellenwood, GA (US); Liam J. Stannard, Lawrenceville, GA (US); Donald W. Cash, Dunwoody, GA (US); Scott Klein, San Jose, CA (US); Richard M. Onyon, San Jose, CA (US)

(73) Assignee: fusionOne, Inc., San Jose, CA (US)

( * ) Notice: Subject to any disclaimer, the term of this patent is extended or adjusted under 35 U.S.C. 154(b) by 384 days.

(21) Appl. No.: 09/641,028

(22) Filed: Aug. 17, 2000

Related U.S. Application Data

(63) Continuation-in-part of application No. 09/490,550, filed on Jan. 25, 2000, and a continuation-in-part of application No. 09/491,675, filed on Jan. 26, 2000, and a continuation-in-part of application No. 09/491,694, filed on Jan. 26, 2000.

(51) Int. Cl.
*G06F 17/30* (2006.01)

(52) U.S. Cl. .................................... 707/201; 707/104.1
(58) Field of Classification Search .................. 707/10, 707/201, 203; 345/762; 370/359; 439/533; 455/3.05; 705/9; 709/204, 228, 248
See application file for complete search history.

(56) References Cited

U.S. PATENT DOCUMENTS

| | | | |
|---|---|---|---|
| 5,130,993 A | | 7/1992 | Gutman et al. .............. 714/775 |
| 5,392,390 A | * | 2/1995 | Crozier ........................ 345/762 |

(Continued)

FOREIGN PATENT DOCUMENTS

| | | |
|---|---|---|
| EP | 0 986 225 A1 | 3/2000 |
| EP | 1180890 A2 | 2/2002 |
| GB | 2388050 A | 2/2002 |

(Continued)

OTHER PUBLICATIONS

Internate Mail Consortium: "vCard Overview," Retrieved from the Internet: www.imc.org/pdl/vcardoverview.html, Oct. 13, 1998.

(Continued)

*Primary Examiner*—Apu Mofiz
(74) *Attorney, Agent, or Firm*—Vierra Magen Marcus & DeNiro LLP

(57) ABSTRACT

A base rolling engine for collapsing data packages stored in a data transfer and synchronization system. A first data package is provided. The first data package has a first transaction including an identification number, an action, and a plurality of fields. Each field has an attribute representing change information. A second data package is also provided. The second data package has a second transaction made subsequent to the first transaction. The second transaction has an identification number, an action, and a field with an attribute. The base rolling engine determines whether the identification number of the second transaction corresponds to the identification number of the first transaction. The base rolling engine also determines whether the field of the second transaction corresponds to one of the fields of the first transaction. When the identification numbers of the first and second transactions correspond to one another, and the field of the second transaction corresponds to one of the fields of the first transaction, the first and second data packages are combined. A combined data package is thus defined having a combined transaction with the identification number. The combined data package replaces the second data package, and the first data package is deleted.

14 Claims, 16 Drawing Sheets

U.S. PATENT DOCUMENTS

| | | | | |
|---|---|---|---|---|
| 5,519,606 | A | * 5/1996 | Frid-Nielsen et al. | 705/9 |
| 5,574,906 | A | 11/1996 | Morris | 707/1 |
| 5,623,661 | A | 4/1997 | Hon | 701/1 |
| 5,628,005 | A | 5/1997 | Hurvig | 707/8 |
| 5,630,081 | A | 5/1997 | Rybicki et al. | 345/839 |
| 5,638,508 | A | 6/1997 | Kanai et al. | 714/20 |
| 5,649,195 | A | 7/1997 | Scott et al. | 707/201 |
| 5,666,553 | A | 9/1997 | Crozier | 715/540 |
| 5,682,524 | A | 10/1997 | Freund et al. | 711/5 |
| 5,684,990 | A | 11/1997 | Boothby | 707/203 |
| 5,694,596 | A | 12/1997 | Campbell | 707/10 |
| 5,701,423 | A | 12/1997 | Crozier | 345/762 |
| 5,706,509 | A | 1/1998 | Man-Hak Tso | 707/201 |
| 5,710,922 | A | 1/1998 | Alley et al. | 707/201 |
| 5,727,202 | A | * 3/1998 | Kucala | 707/10 |
| 5,729,735 | A | 3/1998 | Meyering | 707/10 |
| 5,729,739 | A | 3/1998 | Cantin et al. | 707/103 R |
| 5,729,743 | A | 3/1998 | Squibb | 707/203 |
| 5,742,792 | A | 4/1998 | Yanai et al. | 711/162 |
| 5,745,750 | A | 4/1998 | Porcaro | 707/102 |
| 5,745,906 | A | 4/1998 | Squibb | 707/203 |
| 5,758,150 | A | 5/1998 | Bell et al. | 707/10 |
| 5,768,597 | A | 6/1998 | Simm | 717/174 |
| 5,771,354 | A | 6/1998 | Crawford | 709/229 |
| 5,778,346 | A | 7/1998 | Frid-Nielsen et al. | 705/9 |
| 5,778,388 | A | 7/1998 | Kawamura et al. | 707/203 |
| 5,787,247 | A | 7/1998 | Norin et al. | 709/220 |
| 5,787,262 | A | 7/1998 | Shakib et al. | 709/205 |
| 5,809,497 | A | 9/1998 | Freund et al. | 707/2 |
| 5,812,773 | A | 9/1998 | Norin | 709/204 |
| 5,812,793 | A | 9/1998 | Shakib et al. | 709/201 |
| 5,832,489 | A | 11/1998 | Kucala | 707/10 |
| 5,832,518 | A | 11/1998 | Mastors | 707/202 |
| 5,832,519 | A | 11/1998 | Bowen et al. | 707/203 |
| 5,845,283 | A | 12/1998 | Williams et al. | 707/101 |
| 5,875,296 | A | 2/1999 | Shi et al. | 713/202 |
| 5,884,323 | A | 3/1999 | Hawkins et al. | 707/201 |
| 5,884,325 | A | 3/1999 | Bauer et al. | 707/201 |
| 5,893,119 | A | 4/1999 | Squibb | 707/203 |
| 5,897,640 | A | 4/1999 | Veghte et al. | 707/202 |
| 5,897,642 | A | 4/1999 | Capossela et al. | 707/203 |
| 5,907,793 | A | 5/1999 | Reams | 725/122 |
| 5,935,262 | A | 8/1999 | Barrett et al. | 714/46 |
| 5,937,405 | A | 8/1999 | Campbell | 707/10 |
| 5,943,676 | A | 8/1999 | Boothby | 707/201 |
| 5,961,590 | A | 10/1999 | Mendez et al. | 709/206 |
| 5,968,131 | A | 10/1999 | Mendez et al. | 709/246 |
| 5,974,238 | A | 10/1999 | Chase, Jr. | 709/248 |
| 5,974,563 | A | 10/1999 | Beeler, Jr. | 711/5 |
| 6,000,000 | A | 12/1999 | Hawkins et al. | 707/201 |
| 6,006,274 | A | 12/1999 | Hawkins et al. | 709/248 |
| 6,012,063 | A | 1/2000 | Bodnar | 707/101 |
| 6,016,478 | A | 1/2000 | Zhang et al. | 705/9 |
| 6,023,708 | A | 2/2000 | Mendez et al. | 707/203 |
| 6,023,723 | A | 2/2000 | McCormick et al. | 709/206 |
| 6,034,621 | A | 3/2000 | Kaufman | 340/7.21 |
| 6,044,381 | A | 3/2000 | Boothby et al. | 707/201 |
| 6,052,735 | A | 4/2000 | Ulrich et al. | 709/236 |
| 6,058,399 | A | 5/2000 | Morag et al. | 707/201 |
| 6,061,790 | A | 5/2000 | Bodnar | 713/171 |
| 6,065,018 | A | 5/2000 | Beier et al. | 707/202 |
| 6,081,900 | A | 6/2000 | Subramaniam et al. | 713/201 |
| 6,131,096 | A | 10/2000 | Ng et al. | 707/10 |
| 6,131,116 | A | 10/2000 | Riggins et al. | 709/219 |
| 6,141,011 | A | 10/2000 | Bodnar et al. | 345/812 |
| 6,141,664 | A | 10/2000 | Boothby | 707/201 |
| 6,151,606 | A | * 11/2000 | Mendez | 707/201 |
| 6,202,085 | B1 | 3/2001 | Benson et al. | 709/205 |
| 6,205,448 | B1 | 3/2001 | Kruglikov et al. | 707/200 |
| 6,212,529 | B1 | 4/2001 | Boothby et al. | 707/201 |
| 6,216,131 | B1 | 4/2001 | Liu et al. | 707/102 |
| 6,219,694 | B1 | 4/2001 | Lazaridis et al. | 709/206 |
| 6,223,187 | B1 | 4/2001 | Boothby et al. | 707/201 |
| 6,226,650 | B1 | 5/2001 | Mahajan et al. | 707/201 |
| 6,247,135 | B1 | 6/2001 | Feague | 713/400 |
| 6,272,545 | B1 | * 8/2001 | Flanagin et al. | 709/228 |
| 6,275,831 | B1 | 8/2001 | Bodnar et al. | 707/201 |
| 6,282,698 | B1 | 8/2001 | Baker et al. | 717/118 |
| 6,295,541 | B1 | * 9/2001 | Bodnar et al. | 707/203 |
| 6,304,881 | B1 | 10/2001 | Halim et al. | 707/201 |
| 6,324,544 | B1 | 11/2001 | Alam et al. | 707/201 |
| 6,330,568 | B1 | 12/2001 | Boothby et al. | 707/201 |
| 6,397,351 | B1 | 5/2002 | Miller et al. | 714/13 |
| 6,401,104 | B1 | 6/2002 | LaRue et al. | 707/203 |
| 6,405,218 | B1 | 6/2002 | Boothby | 707/201 |
| 6,437,818 | B1 | 8/2002 | Ludwig et al. | 348/14.09 |
| 6,449,622 | B1 | 9/2002 | LaRue et al. | 707/201 |
| 6,457,062 | B1 | 9/2002 | Pivowar et al. | 709/248 |
| 6,487,560 | B1 | 11/2002 | LaRue et al. | 707/203 |
| 6,671,703 | B1 | 12/2003 | Thompson et al. | 707/202 |
| 6,684,206 | B1 | 1/2004 | Chen et al. | 707/3 |
| 6,718,348 | B1 | 4/2004 | Novak et al. | 707/201 |
| 2001/0044805 | A1 | 11/2001 | Multer et al. | 707/201 |
| 2002/0138765 | A1 | 9/2002 | Fishman et al. | 713/201 |
| 2003/0037020 | A1 | 2/2003 | Novak et al. | 707/1 |
| 2003/0069874 | A1 | 4/2003 | Hertzog et al. | 707/1 |

FOREIGN PATENT DOCUMENTS

| | | |
|---|---|---|
| JP | 11242620 | 9/1999 |
| JP | 11242677 | 9/1999 |
| WO | WO 97 04391 | 2/1997 |
| WO | EP 0801487 | 10/1997 |
| WO | WO 97 41520 | 11/1997 |
| WO | WO 98 21648 | 5/1998 |
| WO | WO 98 54662 | 12/1998 |
| WO | WO 99/05813 | 2/1999 |
| WO | WO 99/06900 | 2/1999 |
| WO | WO 99/36870 | 7/1999 |
| WO | WO 99 40514 | 8/1999 |
| WO | WO 99/45451 | 9/1999 |
| WO | WO 99/45484 | 9/1999 |
| WO | WO 99/50761 | 10/1999 |
| WO | WO 00/11832 | 3/2000 |
| WO | WO 00/16222 | 3/2000 |
| WO | WO 00/29998 | 5/2000 |
| WO | WO 01/71539 | 9/2001 |

OTHER PUBLICATIONS

Internate Mail Consortium: "vCard The Electronic Business Card," Retrieved from the Internet: www.imc.org/pdl/vcard-white.html, Jan. 1, 1997.

Batista et al., "Mining Web Access Logs of an On-line Newspaper," A survey, SIGKKD Exploration, Jul. 2000, 8 pages.*

Lee et al., "Monitoring Data Archives for Grid Environment," 11th IEEE symposium on high performance distributed computing, Jul. 2002, pp. 1–10.*

Intellisync email Accelerator, A detailed guide to functionality, Product functionality paper, Mar. 2004, pp. 1–18.*

* cited by examiner

Desktop
Device Engine

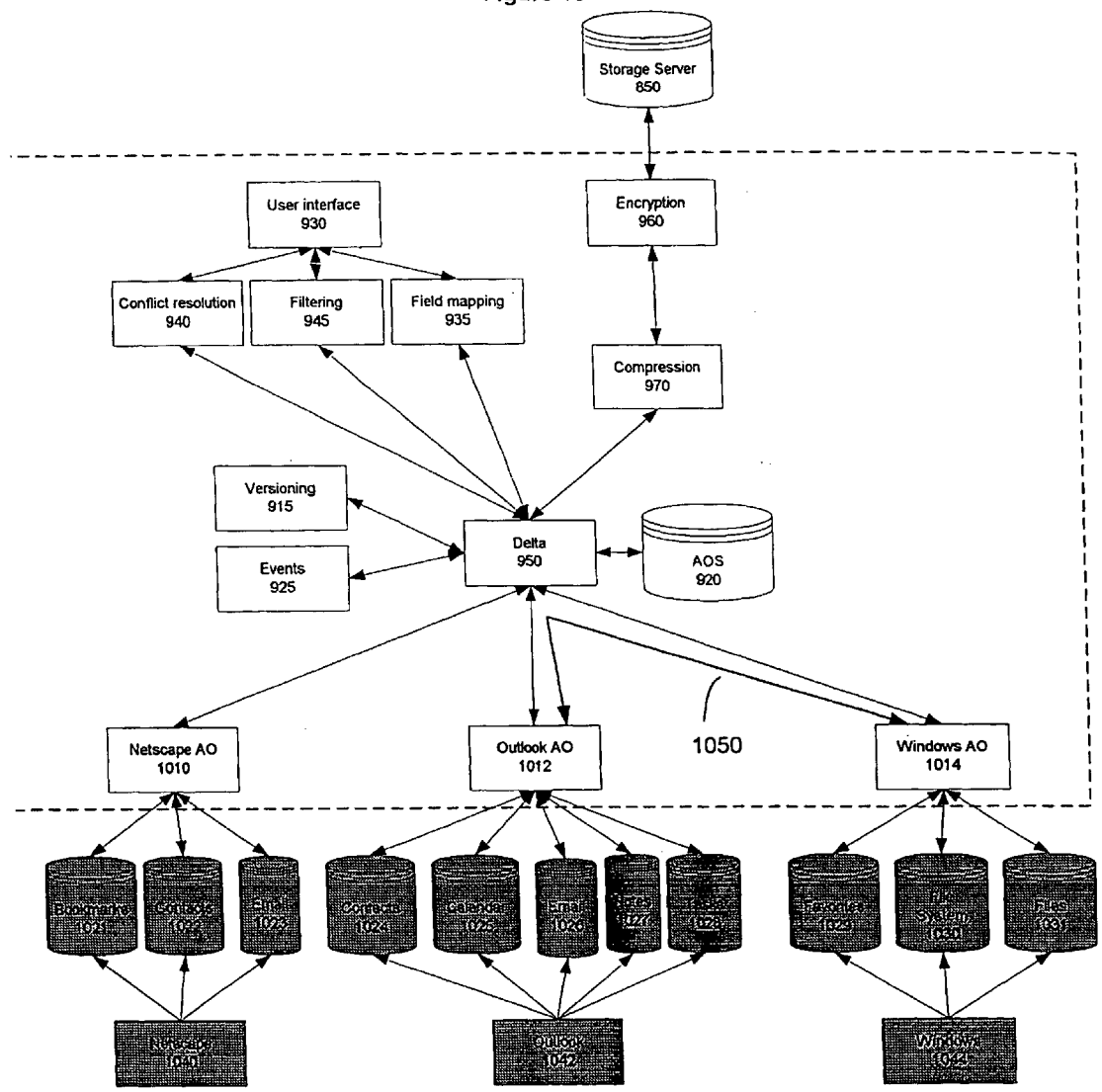

Object Hierarchy

Figure 13

| Note Item 1310 | Email Item 1320 | Task Item 1330 | Calendar Item 1340 | Bookmark Item 1350 | File Item 1360 | Contact Item 1390 |
|---|---|---|---|---|---|---|
| Note Object<br>Categories<br>Color<br>Created<br>Do Not AutoArchive<br>Icon<br>In Folder<br>Message Class<br>Modified<br>Outlook Internal Version<br>Outlook Version<br>Read<br>Size<br>Subject | Account<br>Attachment<br>Bcc<br>Billing Information<br>Categories<br>Cc<br>Changed By<br>Conversation<br>Created<br>Defer Until<br>Do Not AutoArchive<br>Download State<br>Due By<br>Expires<br>Flag Status<br>Follow Up Flag<br>From<br>Have Replies Sent To<br>Icon<br>Importance<br>In Folder<br>Junk E-mail<br>Type<br>Message Class<br>Mileage<br>Modified<br>Outlook Internal Version<br>Outlook Version<br>Read<br>Received<br>Remote Status<br>Retrieval Time<br>Sensitivity<br>Sent<br>Size<br>Subject<br>To<br>Tracking Status | % Complete<br>Actual Work<br>Assigned<br>Attachment<br>Billing Information<br>Categories<br>Company<br>Complete<br>Contacts<br>Conversation Created<br>Date Completed<br>Do Not AutoArchive<br>Due Date<br>Icon<br>In Folder<br>Message Class<br>Mileage<br>Modified<br>Outlook Internal Version<br>Outlook Version<br>Owner<br>Priority<br>Read<br>Recurring<br>Reminder<br>Reminder Override Default<br>Reminder Sound<br>Reminder Sound File<br>Reminder Time<br>Request Status<br>Requested By<br>Role<br>Schedule+ Priority<br>Sensitivity<br>Size<br>Start Date<br>Status<br>Subject<br>Team Task<br>To<br>Total Work | All Day Event<br>Attachment<br>Billing Information<br>Categories<br>Conversation<br>Created<br>Do Not AutoArchive<br>Duration<br>End<br>Icon<br>Importance<br>In Folder<br>Location<br>Meeting Status<br>Message Class<br>Mileage<br>Modified<br>Optional Attendees<br>Organizer<br>Outlook Internal Version<br>Outlook Version<br>Read<br>Recurrence<br>Recurrence Pattern<br>Recurrence Range End<br>Recurrence Range Start<br>Recurring<br>Remind Beforehand<br>Reminder<br>Reminder Override Default<br>Reminder Sound<br>Reminder Sound File<br>Required Attendees<br>Resources<br>Response Requested<br>Sensitivity<br>Show Time As<br>Size<br>Start<br>Subject | Name<br>URL<br>Created<br>Modified<br>Icon<br>In Folder<br>Version<br>Size<br><br>Channel Item 1370<br><br>Name<br>URL<br>Created<br>Modified<br>Icon<br>In Folder<br>Version<br>Size | Name<br>Type<br>Version<br>Size<br>Created<br>Modified<br>Accessed<br>Permissions<br>Parent<br>ID<br>Attributes<br>Icon<br>Shortcut key<br>Start in<br>Run type<br>Sharing<br><br>Folder Item 1380<br><br>Name<br>Type<br>Version<br>Size<br>Created<br>Modified<br>Accessed<br>Permissions<br>Parent<br>ID<br>Attributes<br>Icon<br>Sharing | Account<br>Address Selected<br>Address Selector<br>Anniversary<br>Assistant's Name<br>Assistant's Phone<br>Attachment<br>Billing Information<br>Birthday<br>Business Address<br>Business Address City<br>Business Address Country<br>Business Address PO Box<br>Business Address Postal Code<br>Business Address State<br>Business Address Street<br>Business Fax<br>Business Home Page<br>Business Phone<br>Business Phone 2<br>Callback<br>Car Phone<br>Categories<br>Children<br>City<br>Company<br>Company Main Phone<br>Computer Network Name<br>Country<br>Created<br>Customer ID<br>Department<br>E-mail<br>E-mail 2<br>E-mail 3<br>E-mail Selected<br>E-mail Selector<br>File As<br>First Name<br>Flag Status<br>Follow Up Flag<br>FTP Site<br>Full Name<br>Gender<br>Government ID Number<br>Hobbies<br>Home Address<br>Home Address City<br>Home Address Country<br>Home Address PO Box<br>Home Address Postal Code<br>Home Address State<br>Home Address Street<br>Home Fax<br>Home Phone<br>Home Phone 2<br>Icon<br>In Folder<br>Initials<br>Internet Free/Busy Address<br>ISDN<br>Job Title<br>Journal<br>Language<br>Last Name<br>Location<br>Mailing Address<br>Mailing Address Indicator<br>Manager's Name<br>Message Class<br>Middle Name<br>Mileage<br>Mobile Phone<br>Modified<br>Nickname<br>Office Location<br>Organizational ID Number<br>Other Address<br>Other Address City<br>Other Address Country<br>Other Address PO Box<br>Other Address Postal Code<br>Other Address State<br>Other Address Street<br>Other Fax<br>Other Phone<br>Outlook Internal Version<br>Outlook Version<br>Pager<br>Personal Home Page<br>Phone 1 Selected<br>Phone 1 Selector<br>Phone 2 Selected<br>Phone 2 Selector<br>Phone 3 Selected<br>Phone 3 Selector<br>Phone 4 Selected<br>Phone 4 Selector<br>Phone 5 Selected<br>Phone 5 Selector<br>Phone 6 Selected<br>Phone 6 Selector<br>Phone 7 Selected<br>Phone 7 Selector<br>Phone 8 Selected<br>Phone 8 Selector<br>PO Box<br>Primary Phone<br>Private<br>Profession<br>Radio Phone<br>Read<br>Referred By<br>Reminder<br>Reminder Time<br>Reminder Topic<br>Send Plain Text Only<br>Sensitivity<br>Size<br>Spouse<br>State<br>Street Address<br>Subject<br>Suffix<br>Telex<br>Title<br>TTY/TDD Phone<br>User Field 1<br>User Field 2<br>User Field 3<br>User Field 4<br>Web Page<br>ZIP/Postal Code |

Pull Synchronization

BASE ROLLING ENGINE FOR DATA TRANSFER AND SYNCHRONIZATION SYSTEM

REFERENCE TO EARLIER FILED APPLICATIONS

This is a continuation-in-part of the following co-pending applications: U.S. application Ser. No. 09/490,550, filed Jan. 25, 2000, U.S. application Ser. No. 091491,675 and U.S. application Ser. No. 09/491,694, filed Jan. 26, 2000, all entitled "Data Transfer and Synchronization System."

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office file or records, but otherwise reserves all copyright rights whatsoever.

FIELD

The invention relates to the transference of data between two systems independent of the form in which the data is kept on the respective systems, and in particular to providing an efficient means of communicating data between systems and devices.

BACKGROUND

The growth of computing-related devices has not been limited to personal computers or work stations. The number of personal computing devices has grown substantially in both type and format. Small, hand-held computers carry a multitude of contact, personal, document, and other information and are sophisticated enough to allow a user to fax, send e-mails, and communicate in other ways wirelessly. Even advanced cellular phones carry enough memory and processing power to store contact information, surf the web, and provide text messaging. Along with the growth in the sophistication of these devices, the need to transfer information between them has grown significantly as well.

With a multitude of different device types on the market, keeping information synchronized among the different devices has become increasingly problematic. For example, an individual keeps a calendar of information on a personal computer in his or her office using a particular personal information manager application. This individual would generally like to have the same information available in a cellular phone, hand-held organizer, and perhaps a home personal computer. The individual may additionally have a notebook computer which requires synchronizing file data such as presentations or working documents between the notebook and the office computer.

Until now, synchronization between both documents and personal information managers has occurred through direct connection between the devices, and generally directly between applications such as a personal information manager in one device and a personal information manager in another device or using an intermediary sync-mapping program. One example of this is the prevalent use of the 3Com Palm® OS-based organizer, such as the 3Com Palm® series of computing devices, which uses its own calendaring system, yet lets users synchronize the data therein with a variety of different personal information manager software packages, such as Symantec's ACT!™, Microsoft's Outlook®, and other systems. In this example, an intermediary synchronization program such as Puma Technology, Inc.'s Intellisync® is required. Intellisync® is an application program which runs on both the hand-held device and the computer which stores the information data and maps data systems between non-uniform data records. In other cases, direct transfer between applications such as transfer between Microsoft's Outlook® computer-based client and Microsoft's Windows CE "Pocket OutlooK" application, is possible. Nevertheless, in both cases, synchronization occurs through direct connection between a personal computer and the personal computing device. While this connection is generally via a cable directly connecting, for example, Palm® device in a cradle to the personal computer, the connection may be wireless as well.

One component of these synchronization systems is that the synchronization process must be able to delineate between when changes are made to specific databases and must make a decision about whether to replace the changed field. Normally, this is measured by a change in one database, and no-change in a second database. In some cases, both databases will have changed between syncs. In this case, the sync operation must determine which of the two changes which has been a made is to "win" and replace the other during the sync. Generally, this determinant of whether a conflict exists allows some means for letting the user resolve the conflict.

In a technical sense, synchronization in this manner is generally accomplished by the copying of full records between systems. At some level, a user is generally required to map data fields from one application to another and specify which data fields are assigned to which corresponding field in a different device. Less mapping is required where developers more robustly support various platforms of applications.

In many instances, the data to be synchronized is generally in the form of text data such as records of addresses, contact information, calendar information, notes and other types of contact information. In certain instances, data to be synchronized will be binary format of executable files or word processor-specific documents. In many cases where document synchronization is required, the synchronization routine simply determines whether or not the documents in question have changed, and uses a time-based representation to determine which of the two files is newer, and replaces the older file with the newer file to achieve synchronization, as long as the older of the two files was in fact not changed. This is the model used in the familiar "Briefcase" function in Microsoft Windows-based systems. If both files have changed, then the synchronization routine presents the option of conflict resolution to the user. Such synchronization schemes are generally relatively inefficient since they require full band-width of the document or binary file to be transferred via the synchronization link. In addition, at some level the synchronization programs require interaction by the user to map certain fields between different programs.

One of the difficulties in providing synchronization between different computing devices is that the applications and platforms are somewhat diverse. Nevertheless, all synchronization programs generally require certain functions in order to be viable for widespread usage. In particular, synchronization programs must work with popular applications on various platforms. Sync applications must allow for conflicts resolution when changes are made to the same information on different devices between syncing events. They must provide synchronization for all types of formats of data, whether it be text data in the form of contacts, e-mails, calendar information, memos or other documents, or binary data in the form of documents or programs in particular types of formats.

In a broader sense, applications which efficiently synchronize data between disparate types of devices can provide advantages in applications beyond synchronizing individual, personal information between, for example, a personal information manager hardware device such as a Palm® computing device, and a personal computer. The same objectives which are prevalent in developing data transfer between personal information management (PIM) devices and desktop systems lend themselves to furthering applications requiring data transfer between other types of devices, on differing platforms. These objectives include speed, low bandwidth, accuracy, and platform independence.

For example, current e-mail systems use a system which is somewhat akin to the synchronization methods used for disparate devices in that an entire message or file is transferred as a whole between different systems. When a user replies to an e-mail, generally the entire text of the original message is returned to the sender, who now has two copies of the e-mail text he/she originally sent out. The same is true if an e-mail attachment is modified and returned. All of the text which is the same between both systems is essentially duplicated on the originator's system.

SUMMARY

The present invention relates to a base rolling engine for collapsing data packages stored in a data transfer and synchronization system. A first data package is provided. The first data package has a first transaction including an identification number, an action, and a plurality of fields. Each field has an attribute representing change information. A second data package is also provided. The second data package has a second transaction made subsequent to the first transaction. The second transaction has an identification number, an action, and a field with an attribute. The base rolling engine determines whether the identification number of the second transaction corresponds to the identification number of the first transaction. The base rolling engine also determines whether the field of the second transaction corresponds to one of the fields of the first transaction. When the identification numbers of the first and second transactions correspond to one another, and the field of the second transaction corresponds to one of the fields of the first transaction, the first and second data packages are combined. A combined data package is thus defined having a combined transaction with the identification number. The second data package is replaced with the combined data package.

BRIEF DESCRIPTION OF THE FIGURES

The invention will be described with respect to various exemplary embodiments thereof. Other features and advantages of the invention will become apparent with reference to the specification and drawings in which:

FIG. 10 is a generalized block diagram of a desktop device engine in an operating system environment such as Windows, according to an exemplary embodiment of the present invention;

FIG. 13 is a listing of exemplary item objects used in accordance with the routines performed in accordance with exemplary embodiments of the present invention.

DETAILED DESCRIPTION

Figure 1:
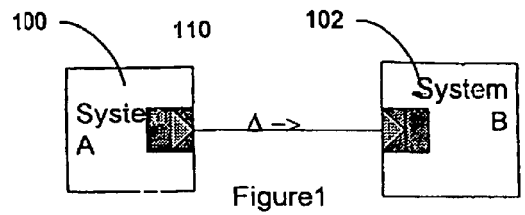
FIGS. 1–7 are generalized block diagrams of data transfer and synchronization systems constructed in accordance with exemplary embodiments of the present invention.

FIG. 1 is a generalized block diagram of a first data transfer and synchronization system constructed in accordance with an exemplary embodiment of the present invention. A first system or device, system A, and a second system or device, system B, are coupled by a communication line 110. It should be readily understood that communication line 110 may be any direct coupling of the two systems allowing data to pass between the systems. For example, in various embodiments, such coupling includes serial ports, parallel ports, Ethernet connections, other types of networks, infrared links, and the like. In various exemplary embodiments, systems A and/or B are personal computers ("PC"), smart telephones, a cellular phones, personal information computing devices, hand-held computers, notebooks, and web browsers. In other exemplary embodiments, systems A and/or B include hardware components of a computer system, and other combinations of hardware including, for example, a processor and memory adapted to receive and provide information to another device. Other exemplary embodiments of Systems A and/or B include software containing such information and residing on a collection or collections of hardware. Examples of such software include applications such as personal information managers, which include contact data and other such information, e-mail systems, and file systems, such as those used by Microsoft Windows NT operating systems, Unix operating systems, Linux operating systems, and other systems capable of storing file types having binary formats which translate to application formats of differing types.

In FIG. 1, System A includes a functional block 100 representing a differencing transmitter. System B includes a functional block 102 representing a differencing receiver. The differencing transmitter 100, upon receipt of a control signal enabling operation of the transmitter, examines a specified data structure of information which is to be transmitted to system B. Differencing transmitter 100 extracts such information from System A and converts the information extracted into difference information Δ. Difference information Δ comprises only the changes to System B's data which have occurred on System B and instructions for implementing those changes. Hence, if the data to be transferred is a change to a file which exists on system B, difference information Δ comprises only the differences in such file and where such differences occur. If the data does not exist at all on System B, the difference information Δ will be the entire file. Difference information Δ received by differencing receiver 102 at System B is reconstructed at System B, and the changes reflected therein are updated on System B. For example, if System A and System B are two computers and an update for certain binary files on System A is required, the differencing transmitter on System A will extract the differences in the file known to exist on System B and any new files, and transmit only those differences (an instructions for where to insert those differences) to the differencing receiver 102. Differencing receiver 102 will interpret the difference information (Δ) and reconstruct the binary files on System B. In this manner, the information on System B is updated without the need to transfer the entire binary files between the Systems.

Figure 2:
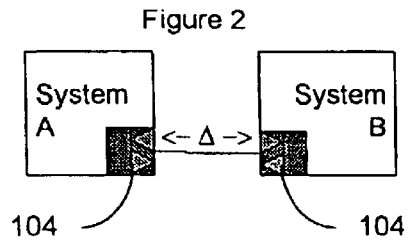

FIG. 2 is a generalized block diagram of a second data transfer and synchronization system constructed in accordance with an exemplary embodiment of the present invention. In FIG. 2, System A and System B include functional blocks 104, each representing a differencing synchronizer. The function of the synchronizer 104 is similar to that of the transmitter and receiver combined; the synchronizer will allow difference information Δ to be both transmitted and received. In one example, System A and System B are a portable computer and a desktop computer, respectively. When information such as contact information is to be synchronized between the two, the differencing synchronizer 104 will extract changes made to the contact information on either System A or System B and at predetermined times, transmit the information Δ between the systems, and reconstruct the data on the receiving system to update information from the sending system, in order to ensure that both systems contain the same data.

Figure 3:
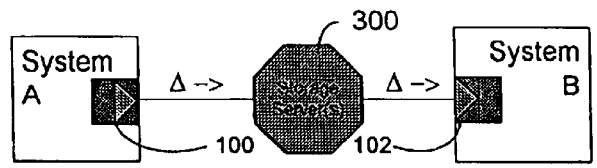

FIG. 3 is a generalized block diagram of a third data transfer and synchronization system constructed in accordance with an exemplary embodiment of the present invention. System A again includes a differencing transmitter and System B includes a differencing receiver 102. In this embodiment, a storage server 300 is coupled between System A and System B. Storage server 300 may store a separate database of the difference information Δ provided by System A, which allows System A to provide its difference information Δ to the storage server 300 at a first point in time, and storage server 300 to provide the same difference information Δ to System B at a second point in time, but not the same as the first point in time. In addition, multiple sets of difference information Δ may be provided at different points in time, and stored for later retrieval by System B. Still further, the difference information sets may be maintained on server 300 to allow data on either System A or System B to be returned to a previous state.

Once again, the storage server 300 is coupled by a direct connection 110 to both System A and System B. Storage server 300 may be a server specifically adapted to receive differencing information Δ from the receiver 100 and provide it to the transmitter 102. In one embodiment, server 300 includes specific functional routines for enabling this transfer. Alternatively, server 300 comprises standard information server types which respond to standard Internet communication protocols such as file transfer protocol (FTP), or hypertext transfer protocol (HTTP).

Figure 4:
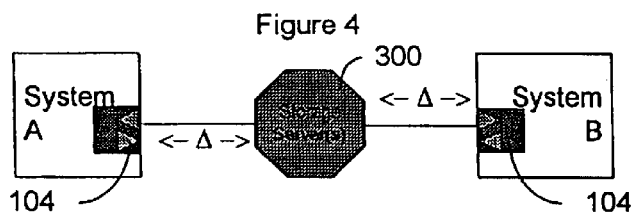

FIG. 4 shows yet another alternative embodiment of the system of the present invention wherein System A and System B, once again coupled directly to a storage server 300 by a direct connection line 110, each include a differencing synchronizer 104. Difference information Δ can be passed to and from System A through synchronizer 104 to and from the storage server 300 at a first point in time, and to and from System B at a second point in time. In this embodiment, storage server 300 includes routines, described below, for resolving conflicts between data which has changed on both System A and System B independently after the last point in times when the systems were synchronized.

Figure 5:
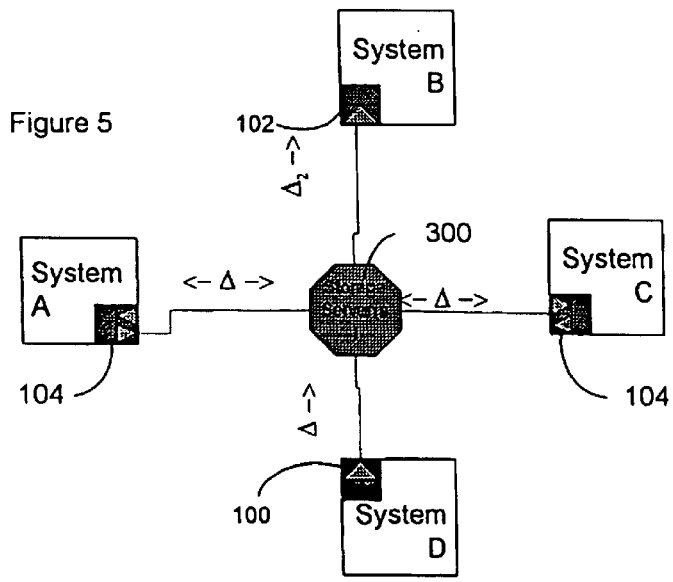

FIG. 5 shows yet another exemplary embodiment of the present invention including four systems: System A which includes a differencing synchronizer 104; System B which includes a differencing receiver 102; System C which also includes a differencing synchronizer 104; and System D which includes a differencing transmitter 100. Each is directly coupled to a storage server 300, allowing control of transmission of differencing data Δ between the various systems. Server 300 may include routines, described in further detail below, to track the various types of systems which comprise System A through System D, and which control the transmission of various components of the difference information Δ to each of the various systems. For example, since System B includes only differencing receiver 102, the difference information $\Delta_2$ which is provided to it may be a sub-component of that which is transferred between System A in the storage server 300, or may be simply receiving broadcast information $\Delta_4$ from System D. In one embodiment of the system of the present invention, server 300 does not itself route the difference information derived from each receiver/transmitter/synchronizer. Server 300 acts as a repository for the information, and the determination of which difference information Δ is attributed to which receiver/transmitter/synchronizer is made by each receiver/transmitter/synchronizer.

Figure 6:
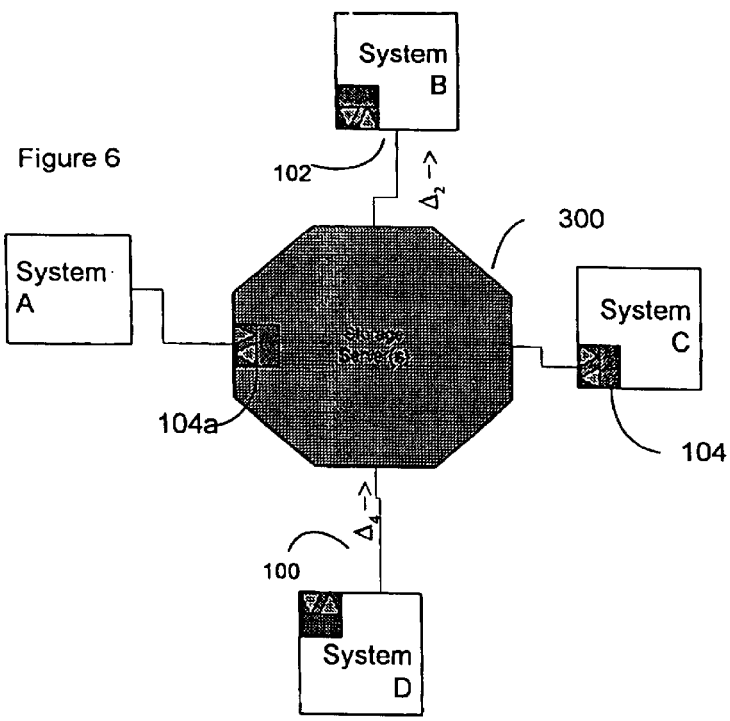

FIG. 6 shows yet another exemplary embodiment of the present invention, in which a synchronizer is provided in storage server 300. It should be recognized that a forwarder and/or receiver may be provided in server 300 as well. The particular embodiment shown herein may be advantageous where device processing power and memory are limited, such as cases where the device is a cell phone. It should be noted that the data transferred between system A and the device engine 104a in such an embodiment may or may not be difference information, depending on whether System A has the capacity to detect and output difference information. Each of the devices may include a differencing receiver, a differencing transmitter, or a differencing synchronizer. It should be understood that a portion of the differencing synchronizer 104*a* may reside on System A and another portion may reside on server 300.

Figure 7:
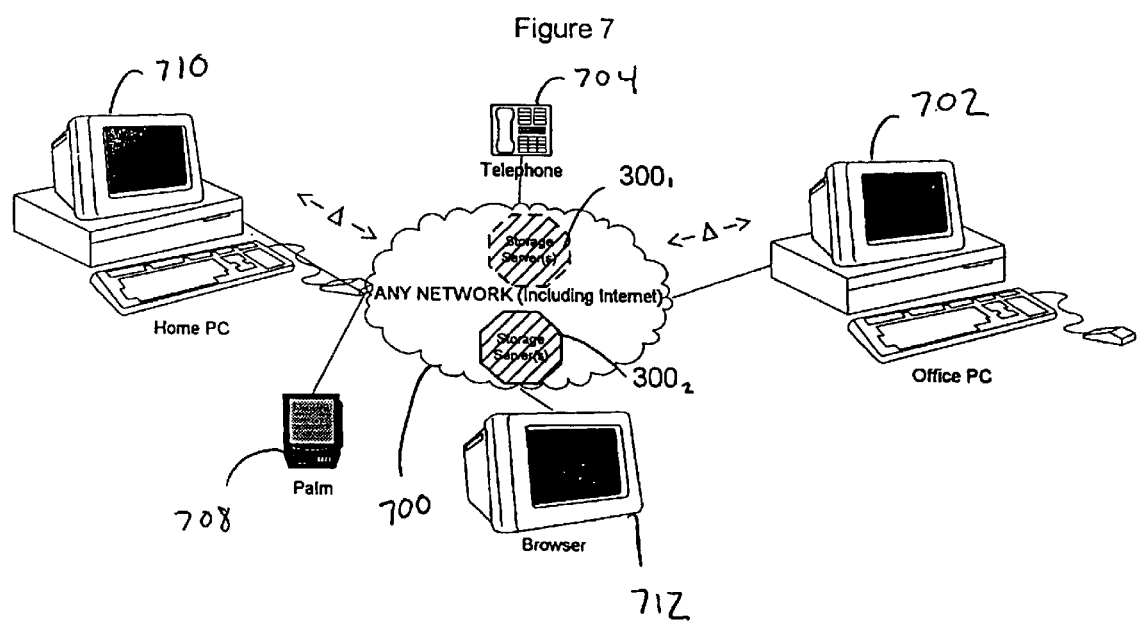

FIG. 7 shows yet another alternative embodiment of the present invention wherein a plurality of devices, such as those shown in FIG. 6 are coupled to a combination of public or private networks 700 such as the Internet. The network 700 includes one or more storage servers $300_1$, $300_2$, and in such cases the difference information Δ transmitted between each device via intermediate storage on one of such servers. Network 700 may couple the devices to one or more specialized function servers, such as servers specifically designed to include a differencing forwarder, receiver or synchronizer. The devices in FIG. 7 comprise, by way of example and without limitation, an office personal computer ("PC") 702, a smart telephone or cellular phone 704, a personal information Palm® computing device 708, a home PC 710, and a web browser 712. Each differencing receiver, differencing transmitter, and/or differencing synchronizer present in devices 702–712 includes means to poll the data stored on storage servers $300_1$, $300_2$ to determine whether the data present at storage server $300_1$, $300_2$ includes difference information which the particular receiver or synchronizer will use to synchronize the data on the device on which it resides.

In the following description, an embodiment wherein the differencing receiver, transmitter, and synchronizer are described will be discussed with respect to its use in synchronizing contact information, calendar information, and binary file information between a plurality of different devices in the context of data synchronization. It will be readily understood that the system of the present invention is not limited to synchronization applications, or applications dependent upon specific types of data, such as contact information or scheduling information. In particular, it will be readily understood that the transmission of data comprising only the differences in data between two systems via routines which extract the data and reassemble data on the various systems, represents a significant advancement in the efficient transmission of data. The present invention allows for optimization in terms of a reduction in the bandwidth utilized to transmit data between two systems, since only changes to data are transferred. This consequently increases the speed at which such transactions can take place since the data which needs to be transmitted is substantially smaller than it would be were entire files transferred between the systems.

Generally, the system comprises client software which provides the functions of the differencing transmitter 100, differencing receiver 102, and differencing synchronizer 104 in the form of a device engine. The device engine includes at least one component particular to the type of device on which the device engine runs, which enables extraction of information from the device and conversion of the information to difference information, and transmission of the difference information to the storage server. This allows the replication of information across all systems coupled to the system of the present invention. Although the storage servers 300 utilized in the system of the present invention may be any type of storage server, such as an Internet server or an FTP server, and may be provided from any source, such as any Internet service provider (ISP), particular aspects of a storage server which may be useful and which may be customized to optimize transfer of information between systems coupled as part of the present invention will be described below. Synchronization of devices utilizing the synchronization system of the present invention is possible as long as an Internet connection between the devices is available. The Internet connection between the devices or between the devices and a server, need not exist at the same point in time, and new devices may be added to the system of the present invention at any point in time without the loss of information. The system provides totally transparent access to information and the device engine on each device provides an operating system independent extension which allows seamless integration of the personal information services in accordance with the present invention. In addition, only those changes to the information which are required to be forwarded to other systems on the system of the present invention are transmitted to enable exceptionally fast response times. In a still further aspect of the invention, information which is transferred in this manner is encrypted to ensure security over the public portions of the Internet.

Figure 8:
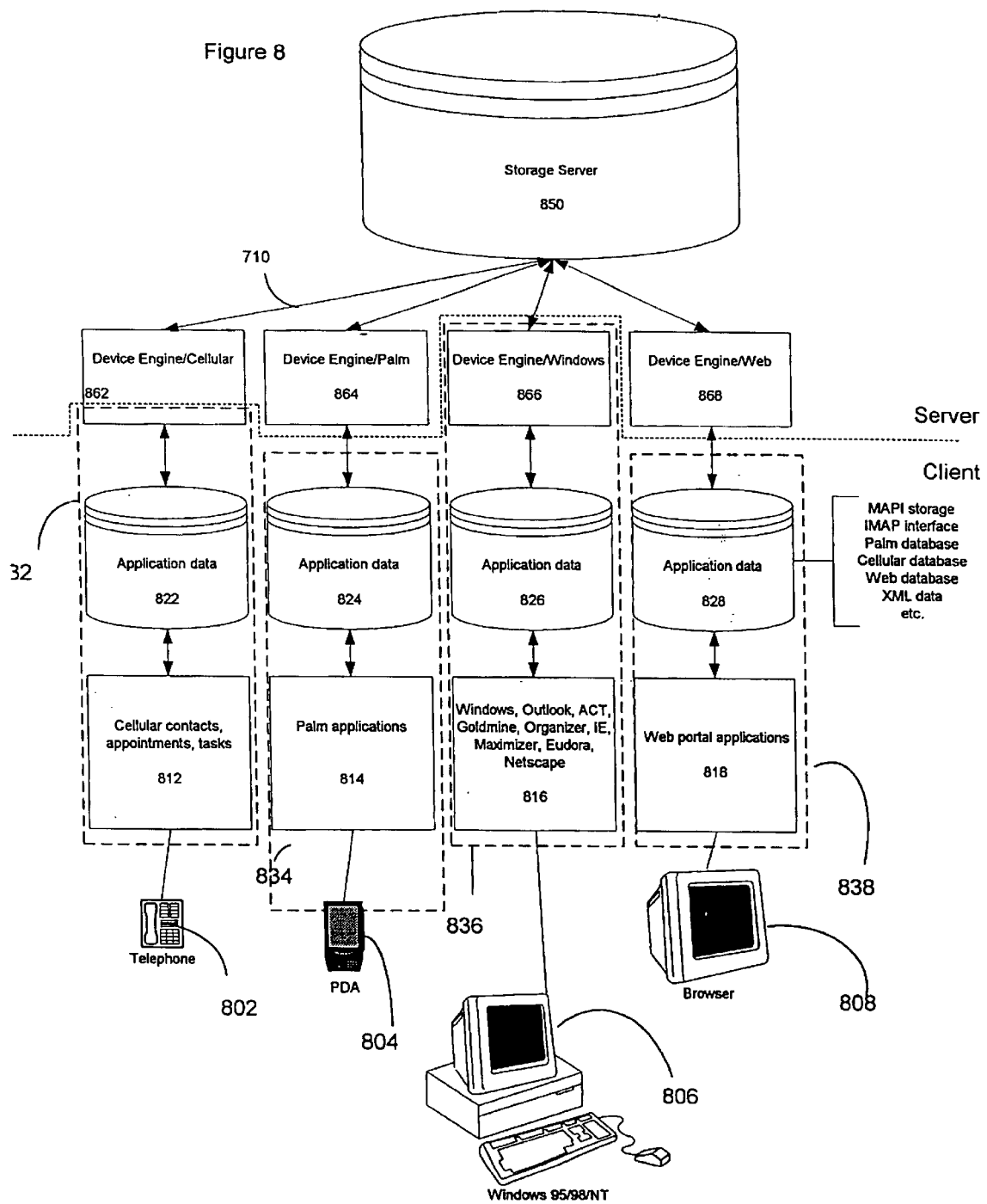
FIG. 8 is a generalized block diagram of the system architecture of a data transfer and synchronization system constructed in accordance with an exemplary embodiment of the present invention.

FIG. 8 is a generalized block diagram of the system architecture of a data transfer and synchronization system constructed in accordance with an exemplary embodiment of the present invention. In this embodiment, the system of the present invention allows the coupling of a collection of personal devices and applications one uses when working with personal information. Nevertheless, the system may be used to broadcast public or private information to various device types. System software in the form of a device engine for each device which is declared a part of the system of the invention is distributed across the collection of devices to enable synchronization. Distribution of the device engines may occur via, for example, an installation package forwarded over an Internet connection. In essence, the device engine software of the present invention forms a distributed processing network which maintains consummate synchronization of all information in the system. The processing load associated with delivering this service is pushed to the end-point devices which provides for easy scaling of the system to ever-larger applications.

In FIG. 8, two types of device engines are shown. One type is situated on the various devices and outputs change data to the server; and the other type is embodied on the server and receives device-generated change information from the device. An alternative exemplary embodiment includes a hybrid of the two, that is, a portion of the device engine is on the device and a portion on the server.

As shown in FIG. 8, any number and type of devices 802–808 may be utilized in accordance with the system of the present invention. A telephone 802 may comprise a cellular phone or a standard POTS-connected telephone. Telephone 802 may include contact information and, as is supported with a newer generation of cellular telephones, appointments and task data stored in a data structure 812. The application 812 which utilizes the application data 822 comprising such information is all stored in the telephone unit 802. Likewise; a personal digital assistant such as a Palm® computing device 804 includes application 814 and application data 824 which may include information such as contacts, appointments and tasks, and may also include file information such as documents which are created and stored on the PDA 804. Device 806 is represented as a Windows personal computer running an operating system such as Microsoft Windows 95, 98, NT or 2000. Applications 816 which may be running on device 806 include the Windows operating system itself, Microsoft Outlook, Symantec's ACT Personal Information Manager, Goldmine Software's Goldmine, Lotus Organizer, Microsoft's Internet Explorer web browser, Netscape's Communicator Suite, Qualcomm's Eudora e-mail, and various other programs, each of which has its own set of application data 826 which is required to be synchronized not only with devices outside the system 806, but also between devices and applications within the system itself. Finally, a dedicated web browser client 808 is shown which couples via the Internet to web portal applications 816 which have their own set of application data 828. Unlike devices 806 which store the application and application data substantially in their own hardware, web portal applications are provided on a separate server and provided to browser 808 via an Internet connection. Nevertheless, the web portal application stored on the portal application provider includes a set of application data 828 which a user may wish to synchronize. For example, a large web portal such as Yahoo! and Snap.com provide services such as free e-mail and contact storage to their users. A user may wish to synchronize this with applications running on their cellular phone, PDA, or Windows devices.

In order to access the specific application data of each of the systems shown in FIG. 8, a device engine is associated with each type of device. A cellular device engine 862 communicates and incorporates itself with the application data 822 of the cellular phone. Likewise, a PDA device engine 864 is provided, which may be based on either the Palm® operating system, Windows CE operating system, or other PDA-type operating systems as necessary. A Windows-based device engine 866 includes a mechanism, discussed below, for extracting application data 826 from supported Windows applications 816, and a web services device engine 868 incorporates to extract application data 828 from web portal applications 818.

Figure 9A:
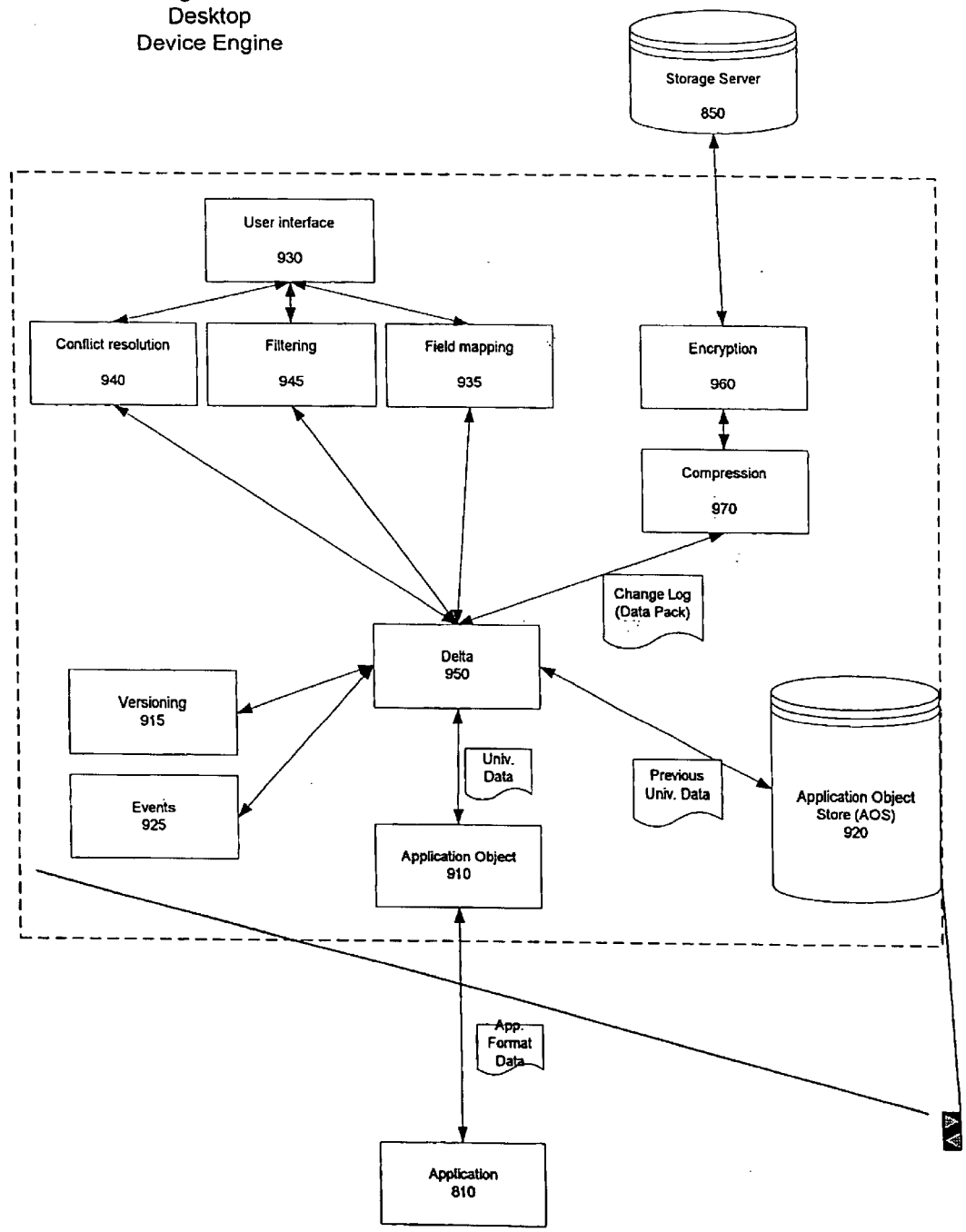
FIG. 9A is a generalized block diagram of a desktop device engine constructed in accordance with an exemplary embodiment of the present invention.
Figure 9B:
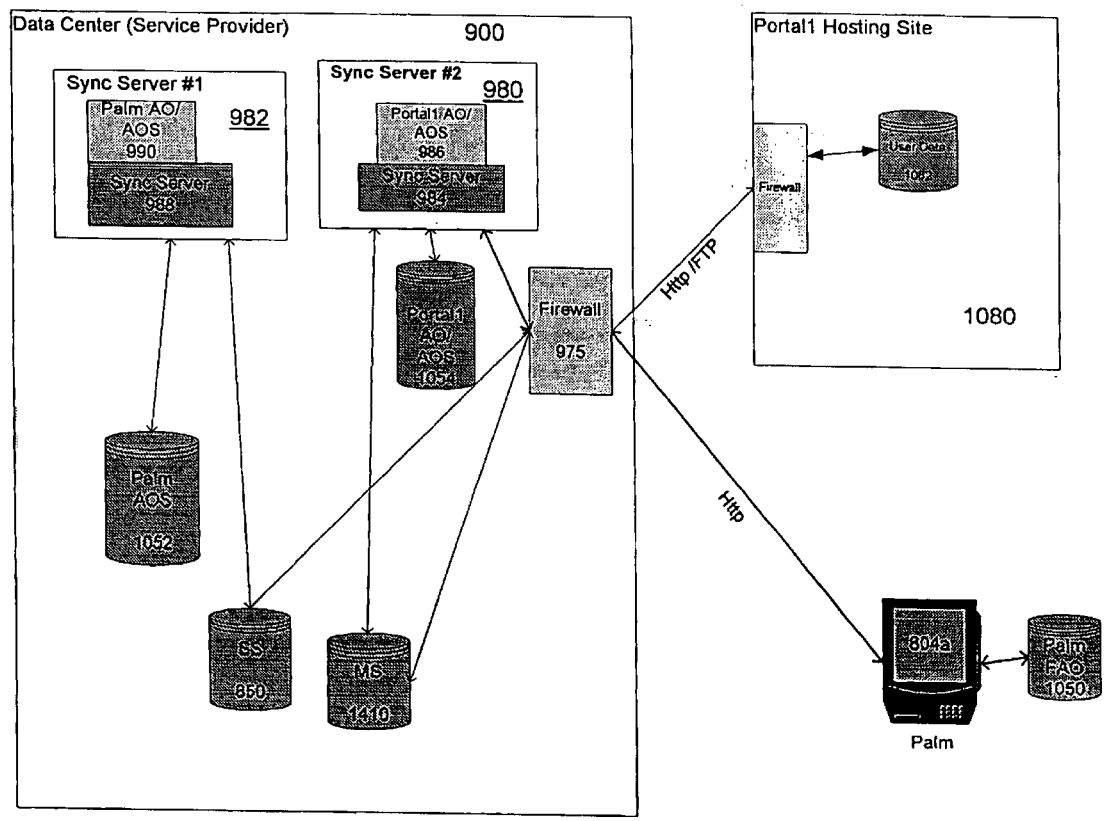
FIG. 9B is a generalized block diagram of a server side device engine constructed in accordance with an exemplary embodiment of the present invention.

As shown in FIG. 8, some device engines are provided entirely on the device (and are referred to herein as desktop device engines), while others include components a the back end server (which may comprise storage server 850 or a specialized server, as shown in FIG. 9B.) This is illustrated generally by lines 832, 834, 836, and 838 in FIG. 8. Also, in FIG. 8, elements above dashed line 855 are provided by an administrator or service provider of the system of the present invention. Each of the device engines 862, 864, 866 and 868 is configured relative to the type of device on which it resides. For example, the Cell phone device engine 862 includes one or more components arranged on the phone while others are on server 850. Conversely, device engine 866 resides entirely on the windows device 806.

Data from each of the devices is coupled via an Internet connection 710 with a storage server 850. As noted above, storage server 850 may be a generic storage server or it may be a storage server specifically adapted for use with the system of the present invention as discussed below. One or more of the storage servers 850 are used to communicate transactions amongst the collection of systems 802, 804, 806, 808. It should be readily recognized that any number of different types of systems 802, 804, 806, 808 may be provided in accordance with the present invention and incorporated into the system. However, for brevity, not all the different types of commercially available computing devices which are currently in use or in development, in which the system of the present invention may be incorporated, are listed.

In its simplest embodiment, the storage server 850 is simply a dumb storage server and each of the device engines transmits only difference information thereto to be stored in a particular location accessible by other device engines in the system. In one embodiment, each device engine implements all processing required to keep all the systems fully synchronized. Only one device engine needs to be coupled to the storage server 850 at one particular point in time. This permits synchronization of multiple systems in a disconnected fashion. Each device engine will download all transactions encapsulating changes that have occurred since the last synchronization from the server and apply them to the particular device.

The change or difference information ($\Delta$) is provided in one or more data packages, the structure of which is described herein. Each data package describes changes to any and all transfer information across all device engines, including but not limited to application data, files, folders, application settings, and the like. Each device engine can control the download of data packages that include classes of information that apply to the specified local device 802, 804, 806 or 808 attached to that specific device engine. For example, device engine 862 will only need to work with changes to information describing contact names and phone numbers in application data 822, while device engine 866 will be required to work with changes to e-mail, changes to document files, notes, as well as contact and address information since the application data 826 is much more extensive than application data 822.

Each device engine includes compression/decompression and encryption/decryption components which allow encryption and/or compression of the data packages transmitted across Internet connection 710. It should be recognized that compression and encryption of the data packages may be optionally provided. It is not required in accordance with the present invention. Each device engine performs mapping and translation steps necessary for applying the data packages to the local format required for that type of information in the application data stores 822–828. The device engine also includes components which allow it to track ambiguous updates in cases where users have changed data to a particular data field on two different systems simultaneously since the last update. In this case, the device engine includes a mechanism for drawing this to the attention of the user and allowing the user to resolve the conflict.

FIG. 9A illustrates an exemplary device engine utilized with a generic application 810 and a generic storage server 850. In particular, the device engine of FIG. 9A is a desktop device engine, since all processing occurs on the device and only difference information is transmitted to server 850. Nevertheless, an understanding of the desktop device engine will aid in understanding server side devices engines, hereinafter described. Shown in FIG. 9 are the functional components of a device engine in block form and their interrelationship to each other. The device engine 860 is equivalent to the functional block of a differencing sequencer 104 shown in FIGS. 1–7. Portions of the functionality are used as needed in a forward-only (a differencing transmitter) or a receive-only (a differencing receiver) capacity, as required by the particular application.

A device engine exists for each and every device that makes up a user's personal information network of devices in the system. As shown in FIG. 9A, each device engine 860 includes an application object 910. The application object is specific to each particular application 810 and provides a standard interface between the device engine and the balance of the data transmission system of the invention, and the application 810. Details of the application object will be described in further detail below. The application object is a pluggable architecture which supports a wide variety of vendor-unique applications. The job of the application object is to map data from the application into a temporary or "universal" data structure by connecting to the application via any number of standard interfaces to gain access to the applications data. The data structure of the application object puts the data in a generic or "universal data" format which may be used by the device engine components to generate data packages for provision to the storage server.

Also provided is an application object store (AOS) 920 which includes a copy of the device's data at a point just after the previous data extraction and synchronization occurred. Application object store 920 is a mirrored interface which stores a snapshot of the previous state of the data from the application object 910 in the device engine. The size of the AOS will depend on the data being collected by each device engine.

The generic output of the application object is provided to a delta module 950. Delta module 950 is a differencing engine which calculates differences in data between the output of the application object 910 and the copy of the data which is provided in an application object store (AOS) 920. The actual differencing and patch routine can comprise a routine such as XDelta or YDelta. The delta module 950 will be referred to herein alternatively in certain portions of the description as "CStructuredDelta." In addition, the difference information is alternatively referred to herein as a "change log." Each change log (or set of difference information) is a self describing series of sync transactions. As described below, the change log may be encrypted and compressed before output to the network.

Hence, during a sync, the Application Object will, using a mechanism discussed below, extract the data of each application in the device and convert it to a universal data format. The delta module will then generate a difference set by comparing the output of the Application Object and the AOS. This difference information is forwarded to the encryption and compression routines for output to the storage server 850 in the form of a data package. Alternatively, the data from one application can be used to synchronize to data in another application in, for example, a windows environment, as shown by arrow 1050 in FIG. 10.

It should be specifically noted that the application object may interface directly unstructured binary data or with structured application data. The differencing routine supports both uses of the delta module 950 in comparison generation.

In some cases, operation of the application object and delta module is simplified by the fact that some applications, such as PDA's, have the ability to output changes to its data. In such cases, the delta module 950 need only provide the data into the data package, since comparison to an AOS is not required—the application already includes a mechanism for tracking changes made to its own data. However, in many cases the applications provide, at most, a standard interface to access the data, such as Microsoft's OBDC interface, the Microsoft standard Application Programming Interface (API), or other similar standard interfaces.

Device engine 860 further includes a versioning module which applies a version number per object in the data package. As explained further below, each object in the data package is assigned a universally unique ID (UUID). Hence, unlike many prior synchronization systems, the system of the present invention does not sync data solely by comparing time stamps of two sets of data. Versioning module 915 allows each device engine to check the state of the last synchronization against data packs which have been provided to the storage server to determine which data packages to apply. This allows the device engine to sync itself independently of the number of times another device engine uploads changes to the storage server. In other words, a first device engine does not care how many times a second device engine uploads data packages to the server.

An events module 925 controls synchronization initialization events. Items such as when to sync, how to sync, trigger the delta module 950 to perform a synchronization operation.

A user interface 930 is provided to allow additional functional features to a system user of the particular device to which the device engine 860 is coupled. The user interface is coupled to a conflict resolution module 940, a filtering module 945, and a field mapping module 935. Each of the modules provides the functionality both necessary for all synchronization programs, and which users have come to expect.

Filtering module 945 allows filtering for types of content based on, for example, a field level content search. The field mapping module 935 allows for the user to re-map certain interpretations of items which were provided in the document stream. For example, if the device engine 860 is operating on a personal computer, and a synchronization is occurring between the personal computer and a notebook computer, and the user has a "my documents" directory on the personal computer which he wishes to map to a different directory on the notebook computer, the field mapping module 935 allows for this re-mapping to occur. It should be recognized that the field mapping module allows for changes in directing the output of the data package. The field mapping module 935 is not necessary to map particular data fields of, for example, contact information from one application, such as Microsoft Outlook, to a different application, such as Symantec's ACT, as is the traditional use of field mapping and synchronizing applications.

Delta module 950 is further coupled to a compression module 970 and an encryption module 960. It should be recognized that the compression encryption modules need not be enabled. Any type of compression module 970, such as the popular PK Zip or Winzip modules, or those available from HiFn Corporation may be utilized in accordance with the invention. Moreover, any type of encryption algorithms, such as MD5, RCH 6, Two Fish, or Blowfish, or any other symmetric encryption algorithm, may be utilized. In one embodiment of the invention, encryption without compression is used. In a second embodiment of the invention, compression without encryption is used. In a third embodiment of the invention, neither compression or encryption is used, and in a fourth embodiment of the invention, both compression and encryption are used.

Versioning module 915 also allows the device engine 860 to support multiple users with distinct synchronization profiles. This allows multiple users accessing the same machine to each synchronize their own data set using the same device engine. For example, if the application 810 on a particular device comprises Microsoft Outlook on a personal computer, coupled to a Microsoft Exchange server, and Outlook is configured to have multiple user profiles, versioning module 915 will track the data applied through the device engine when a sync request occurs. This allows two users of the same Outlook client software which access different data sets, either in the client computer or on a separate server, to utilize the same device engine and the system of the present invention via the same machine. In a further embodiment, a particular device engine supports the use of foreign devices accessing the system via the same connection. Palm® devices, for example, use a cradle to connect to a computer and/or Internet connection. If a particular user wishes to allow another user to use his Palm® pilot cradle connection to synchronize the other user's Palm® pilot, the device engine can generate data packages to update the local application object store for the foreign device. The application object store can therefore be used as a temporary storage for cases allowing synchronization of foreign devices.

The output of the device engine 900 comprises a data package which is output to storage server 850. As noted above, only one device engine need be connected to the storage server 850 at a given time. The data package can be stored on the storage server 850 until a request is made to a particular location of the storage server by another device engine. Likewise, delta engine 900 can query alternative locations on the storage server for access to synchronized data within the system of the present invention. Access to areas of the storage server is controlled by a management server (MS) described more fully below. In one embodiment, each sync operation requires that the device engine for each device login to the management server to authenticate the device and provide the device engine with the location of the individual device's data packages on the storage server.

Data packages may be advantageously provided to the device engine from the storage server in a streaming format, allowing processing to occur using a minimum of bandwidth and storage in the devices. The device engine 860 and particularly the delta module 950 interpret data packages based on the versioning information and the mirrored data present in the application object store 920. When data is returned to the delta module 950 from the storage server 850, the delta module returns differenced data to the application object 910 for the particular application which then translates the delta information into the particular interface utilized for application 810. Once a device engine has been fully applied all data packages from an input stream, it generates a series of data packages that describe the changes made on the local system. The device engine uses the local application object store 920 to keep track of the last synchronized version of each application's actual data, which is then used for the next data comparison by the delta module on the next sync request. Generated data packages can include operations and encode changes generated from resolving ambiguous cases as described above.

FIG. 9B depicts how server based device engines may be provided in the system of the present invention. The Palm® device example is shown in this embodiment, where the Palm® device has the capability of connecting directly to the Internet and a service provider's data center 900. The data center includes a firewall 975 to prevent unauthorized communications with servers resident in the data center 900 and protect integrity of the data. The storage server 850 may communicate directly through the firewall as may the management server (MS) 1410. Shown therein are two sync servers 982 and 984 each of which is dedicated to syncing one particular type of application. Sync server 982 is dedicated to the Palm® device, while sync server 980 is dedicated to, for example, a portal application (Portal1).

Since the Palms® Device 804*a* includes a mechanism for transmitting changes to its data directly, data may be transmitted using HTTP request and response via the firewall 975 to the sync server 982 where differencing and updating of data in the AOS can occur, after which changes can be downloaded to the Palm® 804*a*.

The synchronization server is an application handles concurrent synchronization of user's data. Each Sync Server includes plug-in support for multiple devices to be synchronized using the same sync server executable. Each device type has it's own device name that identifies which AO/AOS components will be used during the sync.

The sync server uses the concept of a universal data record in its internal sync differencing engine and when sending data to and retrieving from external entities such as the AOS and AO. Hence, in the Palm® application, the job of a server AO is simply to take the device-specific format of its record and convert into a universal record format.

The Sync Server has a plug-in architecture so that 3rd party application partners can easily add their services into the server. Currently, if the server is operated in a Microsoft Windows NT Server, the sync server discovers the sync components via the Windows NT registry. In alternative embodiments, this function is performed in a Component Manger which operates on each sync server to manage processing by each of the AO and AOS on the server. Each AO and AOS are implemented as a stand-alone DLL that the Sync Server loads at initialization time, or when adding a new component via the Component Manager.

Each sync server is shown as dedicated to a single application. However, a sync server may handle multiple device types.

In the embodiment of FIG. 9B, it should be noted that, depending on the device type, there are different configurations for the AOS and AO's. For example, the Palm®'s AO data store 1050 resides on the Palm® device 804*a* itself and a separate AOS data store 1052 exists for this configuration (an Oracle database). In the case of Portal1, the AOS and AO use the data store 1054.

Device engines can generate additional data packages intended to resolve synchronization problems in other systems. For example, interfacing with the conflict resolution module 940, if the user makes a change to a particular data store on an application object on his Palm® pilot, then makes an additional change to a personal information manager (PIM) application on his personal computer, the user can specify that the change made on the personal computer will "win" when the conflict is detected by the Δ engine and the versioning information between the two devices. This is essentially a definition that one particular set of data is correct and should replace the second set of data.

FIG. 10 shows an exemplary embodiment of a desktop device engine used in, for example, a Microsoft Windows-based operating system environment. A Windows operating system may have at least three specific applications which may require synchronization. In FIG. 10, the system includes Netscape Communicator application 1040 having data such as bookmarks 1021, contacts 1022, and e-mail 1023; a Microsoft Outlook application 1042 which includes contact information 1024, calendar information 1025, e-mail information 1026, note information 1027, and tasks information 1028; and Windows operating system 1044 information including Favorites data 1029, file system information 1030, and individual files 1031.

Each particular application 1040, 1042, 1044 has an associated application object 1010, 1012, 1014. Each of the respective application objects provides data back to delta module 950 in a generic format which is usable by the delta module in accordance with the foregoing description of the apparatus shown in FIG. 9A. From FIG. 10, it will be additionally seen how the delta module 950 may be utilized to synchronize data between applications running on the same particular server. The device engine hence does an intra-system sync such as, for example, between the contact information 1022 from Netscape and the contact information 1024 from Outlook.

FIG. 10 further illustrates the modularity of the system of the present invention allowing the device engine to include any number of different application objects to be provided on a single device to incorporate all applications run on that device. In operation, during an installation of a device engine into a particular system, the installation program may be tailored to provide application objects which may be present on a given system. For example, the installation program for a Windows machine will carry any number of application objects for systems and applications which may be present on a Windows machine. The installer will check for the presence of given applications, and allow the user to add additional applications which may be installed in locations that are not the normal default installation areas for application support by the application objects which the installer is carrying, or de-select certain applications which, for one reason or another, the user may not wish to install an application object for and render a part of the system of the present invention.

In order to provide security and identification of particular users in an Internet-implemented synchronization system, a management server may be provided in the system of the present invention. The management server is a centralized server which controls behavior and characteristics of the entire network of device engines across all users.

Figure 14:
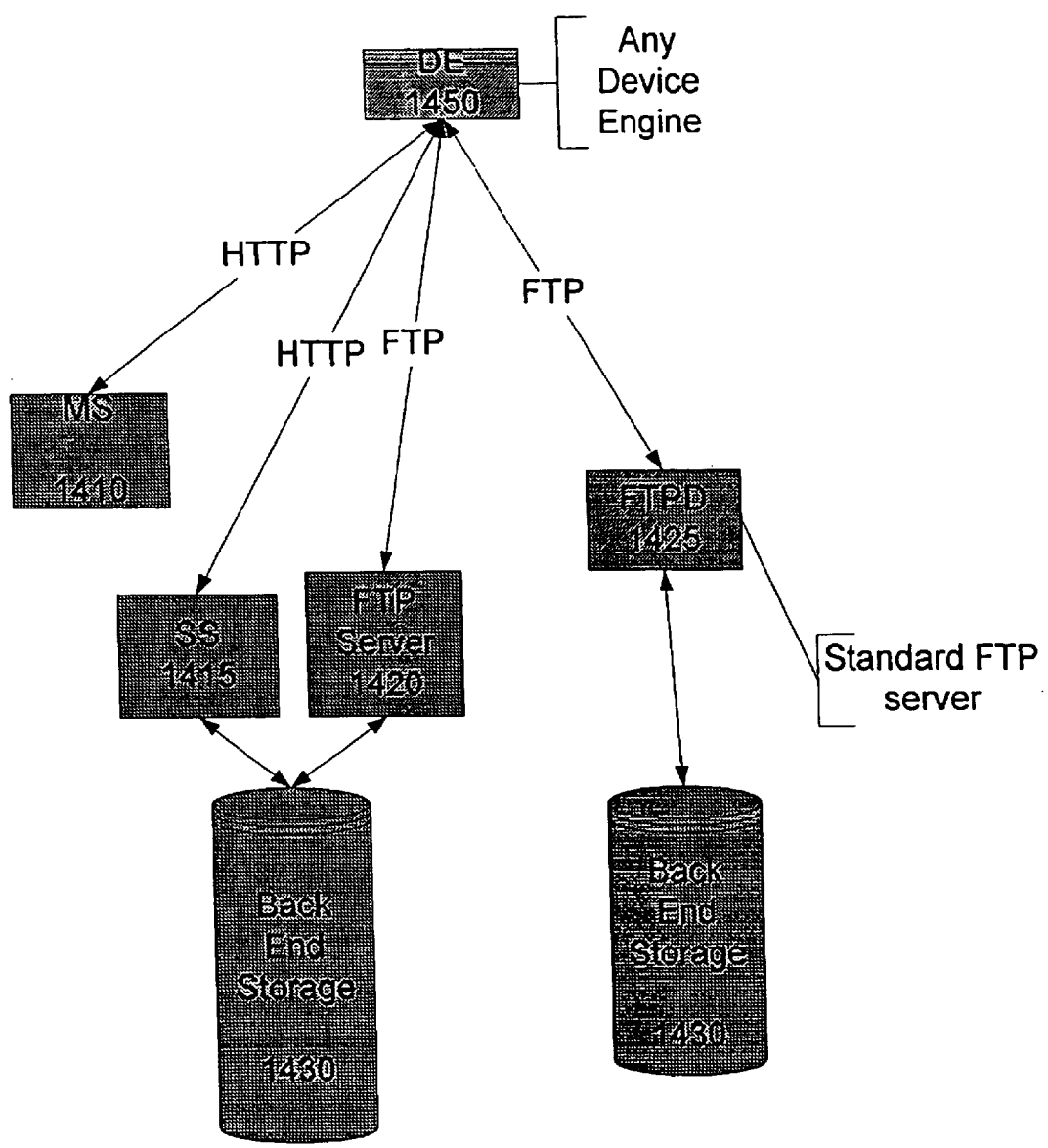
FIG. 14 is a generalized block diagram of a management storage server constructed in accordance with an exemplary embodiment of the present invention.

FIG. 14 shows a general representation of a management server 1410 integrated into an exemplary system of the present invention. Also shown in FIG. 14 is an exemplary device engine 1450 which has HTTP links to both management server 1410, a storage server 1415, and a generic FTP server 1420. As will be discussed hereinafter with reference to the process of the present invention, and the specific implementation of the data below shown in FIGS. 15–17, the management server interacts with the device engine to control authorized access to information on the storage server, or a generic FTP server 1420, 1425 to access device-specific information storage 1430 in accordance with the system of the present invention. This allows any device coupling to the Internet to have access to management protocols and to retain user information across all platforms which the data which is being synched by the system of the present invention must access. The management server preferably communicates using hypertext transfer protocol (HTTP) which may be implemented with a secure sockets layer (SSL) to ensure security. The management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Device actions can request updated copies of individual device engine components, permitting self-update and con- figuration of device engine systems. This permits minimal download designs for device engines that are on low band- width connections enabling the device engines to download additional required components at a later time.

In a further aspect of the system, a value added component may be provided where the management server can support client's advertising mechanisms, enabling the display of banner or similar advertising on a device engine system without the need for a web browser. Cycling of advertisements, statistic collection, and the like, are managed via management server protocols. Online purchase and subscription mechanisms are also supported using the management server protocol.

The management server further supports the accounting, sign-up registration, device edition, storage server selection, and similar functions for each user in the system. In one embodiment, the management server may retain password and encryption information for a given user account. In a second embodiment, such information is not retained. The second embodiment provides the advantage that users may feel more secure if the maintainer of the management server is not in possession of the password to access data in the user's account.

Figure 15:
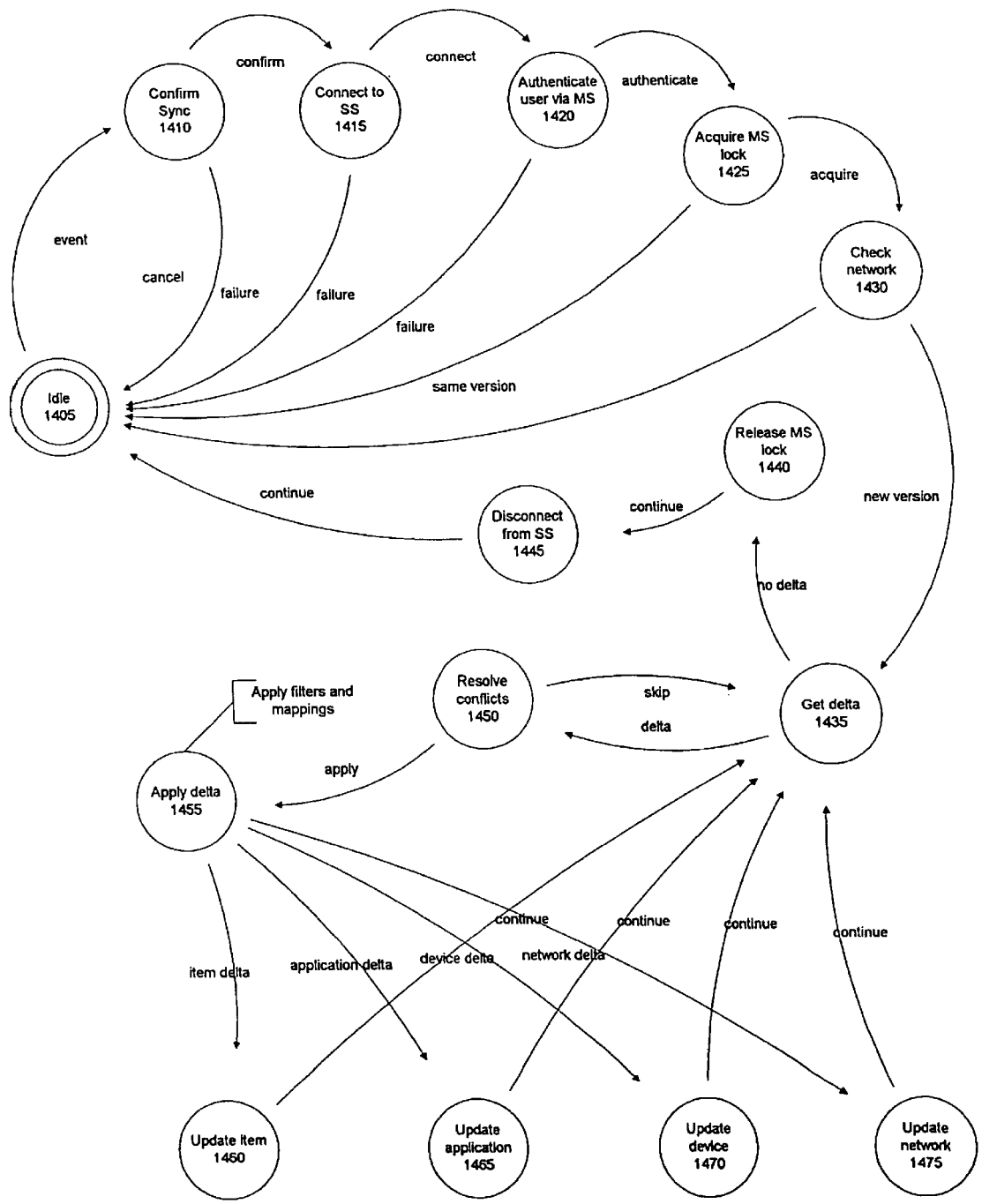
FIG. 15 is a generalized flow diagram illustrating a pull synchronization performed in accordance with an exemplary embodiment of the present invention.
Figure 16:
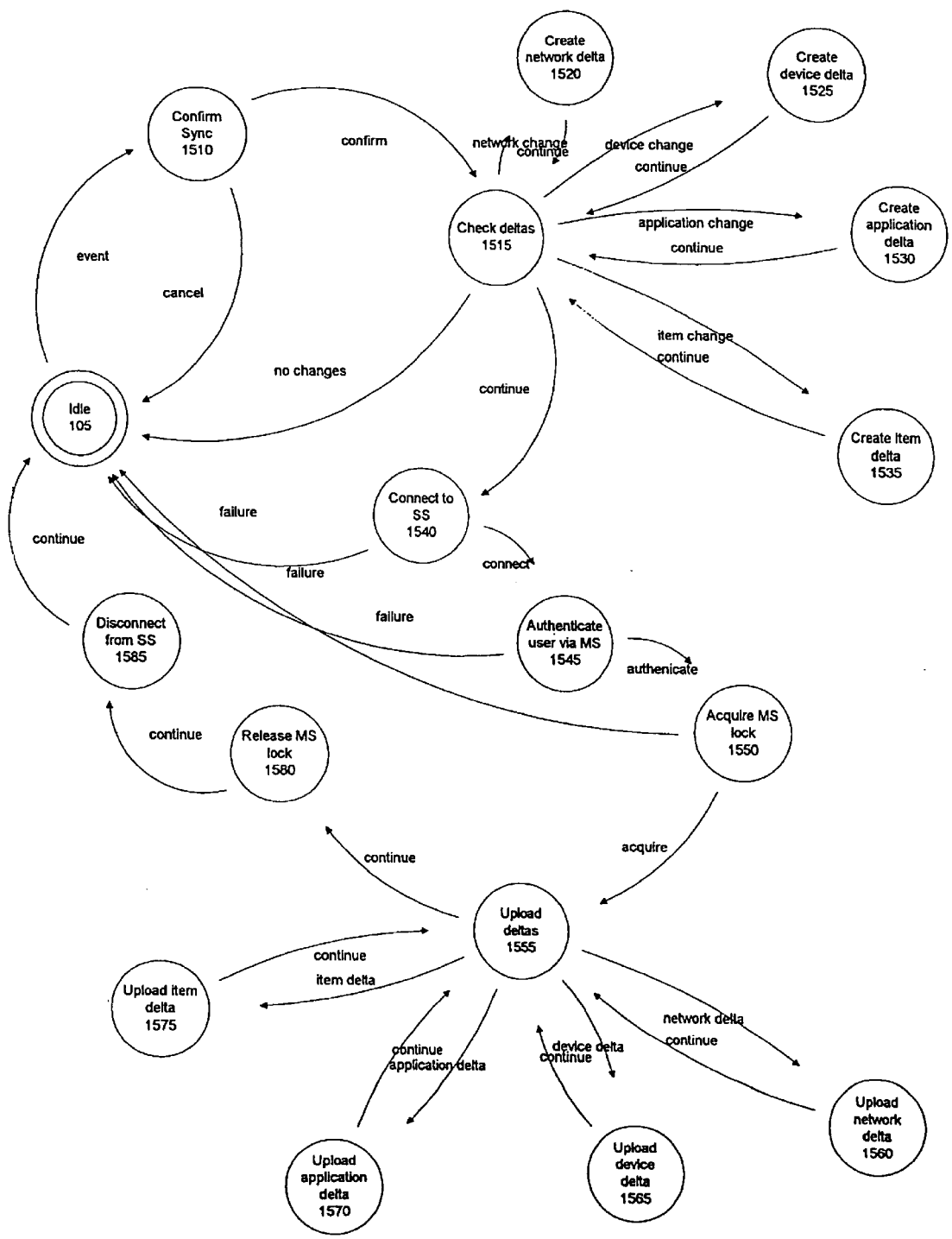
FIG. 16 is a generalized flow diagram illustrating a push synchronization performed in accordance with an exemplary embodiment of the present invention.
Figure 17:
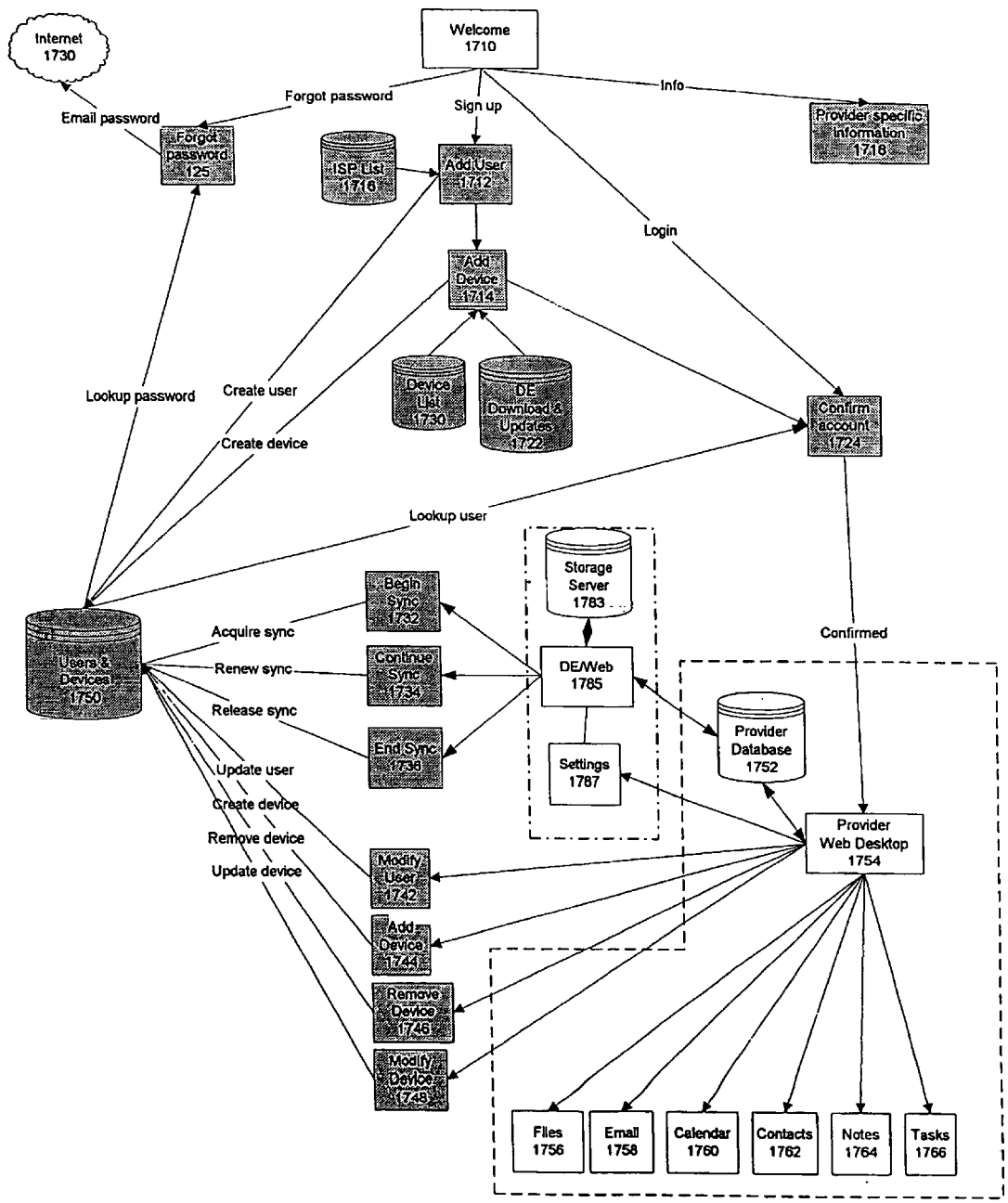
FIG. 17 is a generalized block diagram of a management server architecture constructed in accordance with an exemplary embodiment of the present invention.

Further information with respect to the management server and the data flow from the management server to other components of the system of the present invention will become apparent with respect to the discussion of the process flow and data flow diagrams in FIGS. 15–17.

FIG. 17 shows a general depiction of the data flow and the functional specification of the management server utilized in accordance with the present invention.

As shown in FIG. 17, following a welcome request 1710, a user is allowed to sign out which enables an add user module 1712, and subsequently enables an add device module 1714. If sign-up is not requested, information may be provided via module 1718.

As indicated in FIG. 17, the add user module 1712 adds user records to the user in device database 1750. Additionally, the add device module 1714 adds users and devices to the user device database 1750. A device list 1720, and a device engine download and update database 1722, provide selection data for the add device module 1714. The account authentication module 1724 receives input both directly from a user log-in from the welcome screen at 1710 and from the add device module 1714.

Once an account is authenticated and confirmed, the administrator of the system of the present invention having a private data store at 1770 may choose to provide a web desktop 1754 which allows access to a user's records such as file 1756, e-mail 1758, calendar 1760, contacts 1762, notes 1764, and tasks 1766. The information will be culled from a provider database 1752 which will be synched in accordance with the system of the present invention as previously described. In essence, the provider database 1752 accesses data from the device engines 1780, which include, as discussed above, the storage server, each individual device engine 1785, and a settings database 1787.

Other portions of the management server include the locking modules for beginning a sync 1732, continuing a sync 1734, and ending a sync 1736, and for updating user information including modifying a user 1742, adding devices 1744, removing devices 1746, and modifying devices 1748.

Shown in FIG. 14 is an exemplary storage server 1415. While storage server 1415 may include a generic storage model accessible through any number of standard Internet protocols, in accordance with the present invention, a flexible storage architecture is provided that permits various standard implementations of the system of the present invention. This allows deployment of network services without installation of new server applications and can be responsible for communicating change information between multiple device engines in a consistent fashion.

One or more storage servers 1415 may be used to communicate transaction amongst a collection of devices. Each user's personal information network is represented by a unique account within its own data package storage section. The storage server 1415 maintains persistent store collection of data packages which is, at a minimum, enough data packages to be capable of synchronizing the most out-of-date system in a user's given information network or add information to new devices which are provided in the network. Additional data packages can be maintained to permit rollback of previous versions of information. The storage server can automatically dispose of older data package storage and can support aging of an inactive accounts.

Each storage server 1415 may be implemented using a variety of implementations including a standard FTP server for any operating system platform. The storage server can be implemented using HTTP protocols for increased efficiency and firewall avoidance. The storage server may be implemented using techniques for local storage such as database access or single file storage of a user's entire file system tree. The storage server 1415 may utilize the stored foreign protocol model for moving copies of data packages to other storage servers in the system. In one embodiment, the storage server can allow tunneling of information using an alternative protocol to other storage servers in cases where firewall prevents originating protocol. For example, a storage server can relay an FTP traffic inside an HTTP protocol. Storage servers may include their own locking semantics to arbitrate multiple device engine access to the same server without the need for a separate management server. Each device engine can access only a specific user's data package storage area even though the storage server 1415 may maintain a larger number of data packages across a large number of users. This allows for increased scaling when the storage server is implemented using file system techniques.

In one aspect, the storage server is implemented using standard FTP or HTTP connections for each operation. HTTP is composed of request response pairs. All requests are supposed to be posting commands. Parameters can be set in the form known as "application/X-WWW-form-URLENCODED". The encoding is specified as in RFC1866. Functions for the storage server include testing if the storage server can reach other users which will retrieve a simple text string, a "get" command which transfers the contents of a file as in a binary stream of byes; a put command as a binary stream of data to the storage server, a directory listing command, a remove command, a rename command, an exist command, and the like.

FIG. 15 represents a "pull" synchronization process in accordance with the present invention. Both the pull synchronization illustrated in FIG. 15 and the push synchronization illustrated in FIG. 16 are done from the perspective of the device engine. A pull synchronization as illustrated in FIG. 15 is preferably performed prior to a push synchronization. This allows the device engine to know whether synchronization of its own data is necessary.

Each device has its own triggering mechanism for initiating synchronization. Some devices, such as Windows clients and Palm® pilots are triggered manually when the user presses a "sync" button. Other devices, such as a cellular telephone, may be triggered automatically after another device completes a sync. Regular, time-based triggers are supported as well. A web-based application portal will sync when a user logs into the website security authorization mechanism, and may optionally sync on a log-out of the user or on the session time-out, but only if the user has changed data during the session. For each sync, the triggering event specifies which application types are to sync for the device. This enables a triggering event to trigger only a sync for a particular application type. The management server can specify that no sync is needed for a particular type of application to minimize traffic to the storage server. Syncs may be triggered via an HTTP request to the server. This request holds information about which device to sync and the user log-in information is bounced to the management server for authorization and validation. Syncs may be triggered by sending an HTTP request to the server and passing the authentication information in the data portion of the request to the management server. Each device may include a servlet that is responsible for retrieving the request and ensuring its proper format before passing the synchronization request on to the server.

The device name and device class uniquely identify a particular device type that is being synchronized, and is contained in the management server. Each user has one or more device entries in the management server authorization records and each device name is unique for this user's space. For example, if a user has five devices with his or her own personal identification number, there will be five authorization records. There may be two Windows devices, two different Palm® devices and a web service portal, each having their own personal identification number.

As shown in FIG. 15, the pull synchronization process starts at an idle state 1405 when the triggering event, described above, triggers a synchronization request. The synchronization request is confirmed at 1410 and if the request is verified, a connection is made to the storage server at step 1415. Once a connection is established, the connection to the management server is made at step 1420 to authenticate the user identification via the management server. If authentication is successful, the management server may initiate a management server lock on the storage server so that no conflicting device engines may couple to the same data at the same time. A failure at any of the steps 1410–1425 will return the system to its idle state 1405. Once the engine server lock is acquired, the storage server will be checked to determine whether a new version of the data exists on the storage server at step 1430. If no new version exists, the synchronization process ends.

If a new version of the data exists, the device engine will retrieve the difference information at step 1435 "o get Δ."

Once a Δ is retrieved, conflicts are resolved at step 1450. The resolve conflicts step allows a user to resolve conflicts to multiple types of data which have been changed on both the server portion of the device and in the local data.

Once the conflicts have been resolved at step 1450, the Δ's are applied at step 1455. The apply Δ step 1455 allows for filters and mappings to be accounted for on the local device engine side of the system. As shown at steps 1460, 1465, 1470, and 1475, the Δ may include updates at the item level 1460, application level 1465, device level 1470, or network level 1475. In each of the aforementioned steps, a loop back to the Δ retrieval step 1435 is provided. When no further Δ's are available, the management server lock is released at step 1440.

FIG. 16 shows an exemplary push synchronization in accordance with the system and method of the present invention. Beginning at idle state 1505, a synchronization event occurs and if confirmed at step 1510, Δ's are checked at step 1515. Depending on which type of changes occurred, a network Δ 1520, device Δ 1525, location Δ 1530, or item Δ 1535 will be created.

Once the Δ's for a given application have been created, the method of the present invention continues at step 1540, which enables a connection to a storage server. Upon connection to the storage server, a further connection to management server 1545 will occur to authenticate the user in the system. Failure at any of the aforementioned points will result in returning to idle state 1505. Upon authentication, a management server lock is enabled to ensure that multiple device engines do not connect to the same data at the same time.

Once a lock is acquired at step 1555, Δ's are uploaded to the system. As shown, this may include uploading an item Δ 1575, an application Δ 1570, uploading a device Δ 1565, or a network Δ 1560. Once Δ's have been uploaded to the server, management lock server 1580 is released, and the connection to the storage server is terminated at step 1585.

It should be recognized that such a push synchronization need not occur directly to a server, but may occur directly to a second device engine in accordance with the depiction of the multiple embodiments of the invention in FIGS. 1–7.

Once information is provided into the universal data format, the device engine organizes the format into a data package. Each data package thus includes a description of changes to any and all information for particular application, and a collection of data packages describes changes across all device engines including all different types of data. With encoding and compression, data packages can become very compact to minimize bandwidth and storage requirements across the system of the present invention.

In one particular aspect of the present invention, encoding of the data packages may be provided in a streaming format to allow processing by the device engines with minimal storage and memory configuration at the device engine level.

The device engine can read the stream and determine which records from which applications it needs to update the particular information present on the system on which it resides.

Data packages can be provided in a binary data format. This allows data packages to encode changes to non-application data at a bite level. Hence, if a single bit on a system changes, the system of the present invention allows synchronization of that bit on another system. Changes are described as a sequence of bite-level change operations. One such encoding is using a sequence of insert and copy operations. Insert and copy operations generally define a particular "insertion" of a number of bites from a source file, then how many bites of a changed source file must be inserted to a particular file, then how many bites to insert from a particular new file, with a differencing engine taking the bites in the stream and inserting them into the new file to create the new version of the file.

As will be readily understood by one of average skill in the art, this allows a user to, for example, change a binary file such as a word processing document or other type of attachment, and synchronize such an attachment at the binary level. Specifically, if one forwards an e-mail of a word document to a second individual, the second individual modifies it and wishes to return this document with modifications to the first individual, because the first individual has the original file on his system, if both systems are enabled in the system of the present invention, the second system need only send the changes or the difference information back to the first system in order for the first system to reconstruct the document on the second system using this change data to create the document as intended by the second user.

Multiple caching of both the generation and application of data packages can be utilized to deal with communication issues in accordance with the system of the present invention. It should be further recognized that data packages can be merged into larger meta-data packages. Such meta-data information, such as the organization of multiple device packages, may be encoded into a larger system package. Each system package is essentially an encoded sequence of data packages.

Figure 11:
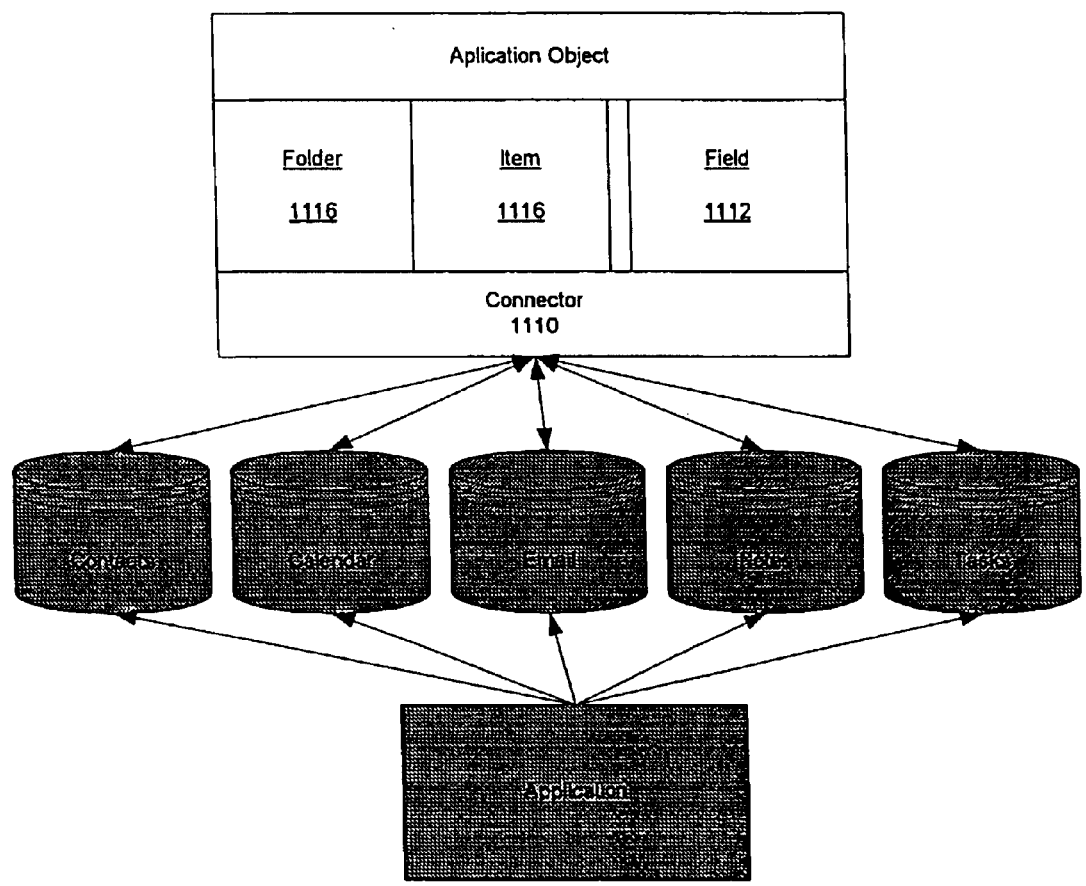
FIG. 11 is a generalized block diagram of an application object incorporated into a device engine constructed according to an exemplary embodiment of the present invention.
Figure 12:
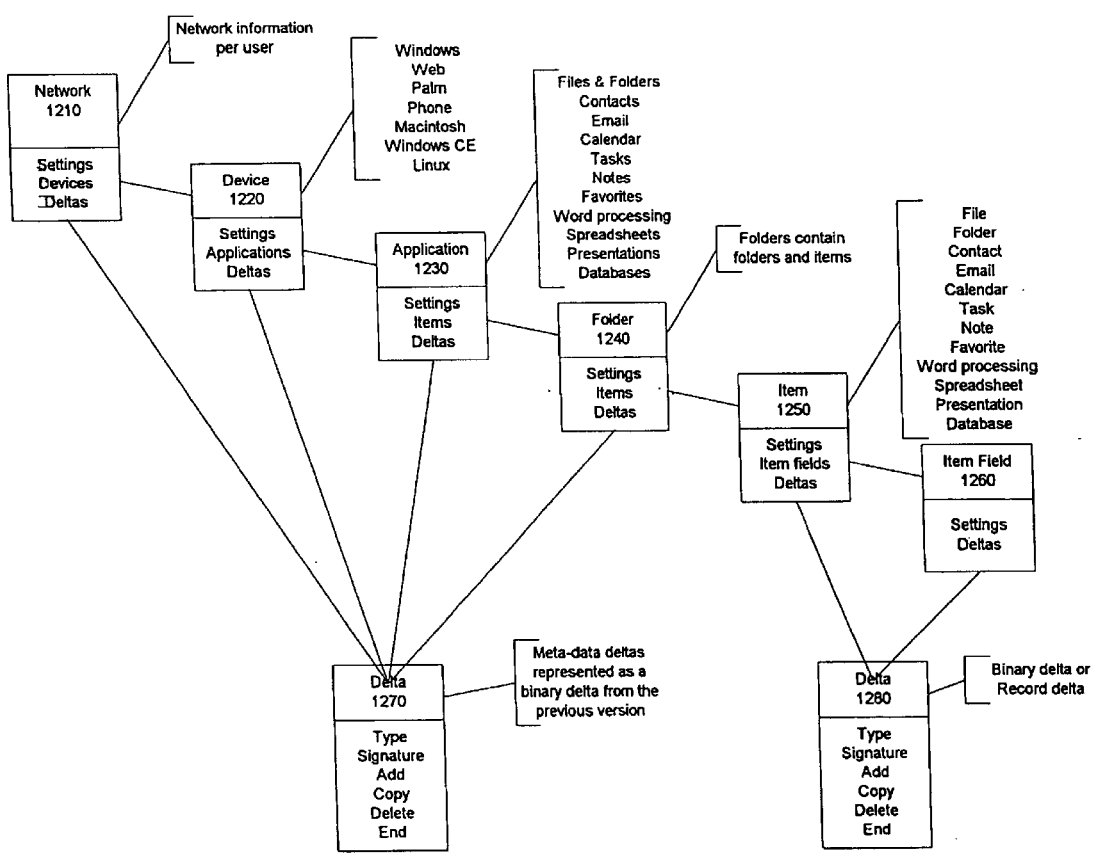
FIG. 12 is a generalized block diagram of storage object hierarchy of a universal data format used in accordance with a system constructed in accordance with an exemplary embodiment of the present invention.

FIG. 12 shows the general format of the data package and universal data format an object stream hierarchy used in accordance with the present invention. With reference to FIGS. 11 and 12, one will note that each item in a particular application data structure will have a particular classification, such as a file, folder, contact, e-mail, calendar, etc. as shown in FIG. 13. The universal data structure contains a mapped item field for each type of data possible from each application supported by the system. Hence a "master" list of every data field mapping possible will contain a large number of items. Each application object requires a subset of such fields. One exception is an application object used for a Web portal application which provides access to all information available on all devices, including other Web portals.

Particular examples of item fields 1260 which may be included for any given item 1250 are shown in FIG. 13. These exemplary item objects may, for example, be from an allocation such as Microsoft Outlook. Outlook allows for note items 1310, e-mail items 1320, task items 1330, calendar items 1340, bookmark items 1350, file items 1360, channel items 1370, folder items 1380, and contact items 1390, all of which have fields such as those represented in FIG. 13.

The data format also contains folder information 1240 which allows the classification of items and consequently their associated item fields into particular categories.

Application objects 1230 include information on the types of applications from which information in the stream is included. Device objects 1220 include information on the origin type of device which the information is originating from. Network objects 1210 include information on a user level to define that the information in the data stream is coming from a particular user.

As detailed above, each application object supports a folder store interface that permits management of collections of information on a folder level, and permits management of folder hierarchies of information. The application object also includes an item interface that permits management of individual information entries such as records or files or components of information entries such as fields within records. Each application object further supports an interface for detection of a vendor application.

A DataPack essentially contains a sequence of transactions describing changes to information. This information can span two basic types: structured or application data, and unstructured or binary file data. Transactions are encoded using an efficient streaming format with tags to represent the actual content objects. This technique permits the continuous extension of the DataPack format as new content is supported.

The general architecture of the package provides for transactions, application data, file data, files, objects and identifiers to be carried in the data package. Generally, transactions, application data, file data, and files have previously been described.

The first portion of the data package will be the data package identifier. Each transaction has a basic architecture of objects and operations. Each piece of content is referred to as an object and is uniquely represented with a Universally Unique Identifier (UUID). Objects typically are represented by a dynamically generated UUID, but more common objects are represented by static UUIDs. Each UUID preferably has a unique 128 bit value which may be assigned by the system provider.

Transactions are broken down into manageable blocks in the form of individual files. These files are then optionally compressed and encrypted and prefixed with appropriate headers. Transactions are grouped into specific files based on the following rules:

Transactions related to account information are grouped into a DataPack file.

Transactions related to a specific data class are grouped into a DataPack file.

Transactions referring to binary data are grouped into separate DataPack files for each file object.

A DataPack file is identified using specific rules based on the file name. The file name is of the form "UUID.VER" where UUID is the identifier for the specific object and VER is the transaction version number. The version number is of the form "D0001" with additional digits used for large version numbers. The "D000" value is preferably reserved for the base version for the object.

The UUID for the user account is generated by the Management Server (MS). The MS also maintains a current table of UUID values and version numbers that provides the root structure for understanding the DataPack files within a user account. The MS also provides necessary locking semantics needed to maintain consistency when multiple device engines attempt to synchronize.

All DataPacks are prefixed with a standardized header that provides basic content information regarding the DataPack. Compression and encryption headers follow the DataPack header if needed.

The data package header information will include version signature, applied versioning information, content type, Δ engine type, compression type, encryption type, applied size, encrypted size, compressed size, raw data size, and other data useful for the device engine in decrypting the data stream to provide the data into a format usable for the application.

The header may optimally have the format:

| Type | Bytes |
| --- | --- |
| Version | 4 |
| Signature | 4 |
| AppliedVersion | 8 |
| ContentType | 4 |
| DeltaType | 4 |
| CompressionType | 4 |
| EncryptionType | 4 |
| AppliedSize | 4 |
| EncryptedSize | 4 |
| CompressedSize | 4 |
| RawSize | 4 |
| Reserved | TBD |

The following ContentType values are permissible:

| Field | Comment |
| --- | --- |
| DP_CONTENT_RAW | Raw |
| DP_CONTENT_COMPRESSED | Compressed |
| DP_CONTENT_ENCRYPTED | Encrypted |

The DeltaType encodes the type of binary file differencing used. The following DeltaType values are permissible using DataPackageDeltaType:

| Field | Comment |
| --- | --- |
| PackageDeltaTypeUninitialized | Uninitialized |
| PackageDeltaTypeRawData | Raw binary data |
| PackageDeltaTypeDeltaXDelta | Xdelta binary difference |
| PackageDeltaTypeDeltaBDiff | Bdiff binary difference |

The compression type specifies whether the DataPack has been compressed. A DataPack compression header follows the DataPack header if a compression type is specified. The following CompressionType values are permissible using Data PackageCompressionType:

| Field | Comment |
| --- | --- |
| PackageCompressionTypeUninitialized | Uninitialized |
| PackageCompressionTypeNone | None |
| PackageCompressionTypePK | PKZip format |
| PackageCompressionTypeLZS | LZS format |

The encryption type specifies whether the DataPack has been encrypted. A DataPack encryption header follows the DataPack header if an encryption type is specified. The following EncryptionType values are permissible using DataPackageEncryptionType:

| Field | Comment |
| --- | --- |
| PackageEncryptionTypeUninitialized | Uninitialized |
| PackageEncryptionTypeNone | None |
| PackageEncryptionTypeXORTest | XOR masked data |
| PackageEncryptionTypeBlowFish | Blowfish |
| PackageEncryptionTypeTwoFish | Twofish |

All DataPack compression headers are encoded using the following format:

| Field | Size (bytes) | Comment |
| --- | --- | --- |
| Size | 4 | Size of data including this header |
| Version | 4 | Version (1) |
| Signature | 4 | Signature (4271) |
| HeaderType | 4 | Headertype (HeaderTypeCompression) |
| Reserved | 12 | Reserved |
| DecompressedSize | 4 | Decompressed size |
| Reserved | 50 | Reserved |
| Reserved | 12 | Reserved |

The following HeaderType values are permissible using DataPackageHeaderType:

| Field | Comment |
| --- | --- |
| HeaderTypeUninitialized | Uninitialized |
| HeaderTypeEncryption | Encryption header |
| HeaderTypeCompression | Compression header |
| HeaderTypeRaw | Raw header |

All DataPack encryption headers are encoded using the following format:

| Field | Size (bytes) | Comment |
| --- | --- | --- |
| Size | 4 | Size of data including this header |
| Version | 4 | Version (6) |
| Signature | 4 | Signature (4270) |
| HeaderType | 4 | Headertype (HeaderTypeEncryption) |
| Reserved | 12 | Reserved |
| DecryptedSize | 4 | Decrypted size |
| InitValue | 16 | TBD |
| KeyLength | 4 | TBD |
| ClearTextKeyBits | 4 | TBD |
| Salt | 4 | TBD |
| PadBytes | 4 | TBD |
| HMAC | 20 | TBD |
| Reserved | 12 | Reserved |

The following Operation values are permissible using the Operation class:

| Field | Comment |
| --- | --- |
| clNop | None |
| clAdd | Add |
| clDelete | Delete |
| clChange | Change |
| clMove | Move |
| clRename | Rename |
| clForceChange | Force change without conflict |

The following FieldDataType values are permissible using clDataType:

| Field | Comment |
| --- | --- |
| clInvalidType | TBD |
| clstring | Unicode String bytes with a 32-bit length prefix |
| clString8 | Unicode String bytes with an 8-bit length prefix |
| clString16 | Unicode String bytes with a 16-bit length prefix |
| clEmpty String | TBD |
| clBlob | 32-bit length followed by a byte stream |
| clBlob8 | 8-bit length followed by a byte stream |
| clBlob16 | 16-bit length followed by a byte stream |
| clEmptyBlob | TBD |
| clByte | 8-bit value |
| clShort | 16-bit value |
| clDword | 32-bit value |
| clQword | 64-bit value |
| clDate | DATE type (double) |
| clDouble | 8 byte real |
| clFloat | 4 byte real |
| clUuid | 16 byte uuid |
| clZero | Zero value |
| clOne | One value |
| clUnspecified | Unspecified value |
| clDefault | Default value |
| clCollection | Collection with 32-bit length |
| clCollection8 | Collection with 8-bit length |
| clCollection 16 | Collection with 16-bit length |
| clEmptyCollection | Collection with no length |

Data package objects are organized into a hierarchy as follows:
Account::=DeviceList+DataClassList
DeviceList::={Device}
DataClassList::={DataClass}+ProviderList
ProviderList::={Provider}+DataStoreList
DataStoreList::={Folder}+ItemList
ItemList::={Item}+FieldList
FieldList::={Field}

An account is the root structure, which identifies information about the users account. It may have exemplary field tags (eFieldTag__[NAME]) such as Name, Password, UserName and Version. The FieldTag ItemType value is specified as ItemType__PIN using enumItemType.

A device is a system identified as part of an account. Examples include PCs, handhelds, Web sites, and so on. It may have tags (eFieldTag__[Name]) such as: "name" and "type" and item type values (eDevice__[Name]) such as Portal, Palm, Windows, CellPhone.

A data class is a grouping of similar information types. Many data classes may be represented for a particular account. The data class may contain field tags (eFieldTag__ [Name]) such as: Name; ItemType; SubType; IsManaged; Provider; Filter and Version.

The following ItemType values are permissible using enumDataClass (eDataClass__[Name]):

| Tag | Description |
| --- | --- |
| UNKNOWN | Unknown |
| CONTACT | Contact/address book |
| EMAIL | Electronic mail |
| CALENDAR | Calendar |
| TASK | Task/to do |
| NOTE | Note/memo |
| JOURNAL | Journal |
| BROWSER | Web browser favorites, cookies, etc. |
| FILESET | Collection of files |
| PIN | Account information |
| DEVICE | Device information |
| FILEBODY | Contents of file |

A Provider is the application that maintains specific information within a data class. There can be more than one provider for a particular data class. Field tags include: Name, AppObjID, Password, Username and Version. Examples of provider tags permissible for the provider (eProvider[Name]) include: Portal, Palm®, MicrosoftOutlook®, Lotus Organizer, Microsoft Internet Explorer, Microsoft Windows, and so on.

Data stores are the containers for storing information within a provider. There can be more than one data store for a particular provider. Folders represent structural organization of information within a data store. Data stores are not required to support folders. Tags (eFieldTag_[Name]) supported for each data store include: Name, ItemType, IsManaged and OriginalPath. Item types permissible for the data store include: unknown; Folder; MAPI; Database and Store_File.

Folders represent structural organization of information within a data store. Data stores are not required to support folders. A folder is represented by a UUID and may contain any of the following field tags (eFieldTag_[Name]): Name; ItemType; IsManaged; FileAttributes; CreationDate; ModificationDate; AccessDate; SpecialFolderType.

The eFieldTag_ItemType value is specified as eItemType_FOLDER using enumItemType.

Items are individual informational components consisting of the actual user data. They may contain field tags such as: Name, ItemType, IsManaged, and Version.

File items typically have the following additional field tags (eFieldTag_[Name]):

FileAttributes

CreationDate

ModificationDate

AccessDate

FileSize

FileBody

DeltaSize

Hash

Item types may take the format (eItemType_[Name]) and may include: extended; folder; attachment; contact; distlist; email; calendar; task; call; note; post; journal; form; script; rule; favorites; subscription; common_favorites; desktop; common_desktop; startmenu; common_startmenu; channels; cookies; programs; common_programs; startup; common_startup; sendto; recent; internet_cache; history; mapped drives; printers; docs; doctemplates; fonts; window_settings; app_data_folder; app_settings; fileset; pin; device; data_store; file; provider; and data_class; internal.

A field is based on one of a set of base type definitions. All field tag information is encoded using the following format:

| Field | Size (bits) | Comment |
|---|---|---|
| FieldTag | 16 | Unique tag number |
| FieldType | 6 | Field base type |
| FieldSubType | 10 | Field sub-type |

A number of Field types are possible, including: unknown; long; dword; date; string; binary; float; double; collection; uniqueid; qword; uuid; file; invalid. LONG is a four byte value encoded in big-endian format. FieldType DWORD is a four byte value encoded in big-endian format. FieldType String is a sequence of Unicode characters followed by a single NULL byte. Interfaces are provided with an MBCS value. FieldType Binary is a sequence of bytes. FieldType UniqueID is a sequence of bytes as defined by the Universally Unique Identifier (UUID) standard. AO interfaces are provided with a Locally Unique Identifier (LUID) value FieldType QWORD is an eight byte value encoded in big-endian format. FieldType File is a UUID that references a separate DataPack containing the file body data. AO interfaces are provided with a sequence of Unicode characters followed by a single NULL byte that describes the full path name for the file.

Any number of filed sub types are possible. Each of the sub-types includes all of the possible data types from all of the supported user applications. As should be well understood, the possibilities in the number of sub-types is quite large, and dynamic as each new application supported by the system of the present invention is added. Examples of sub-types include:

| SubField Description | Description |
|---|---|
| Base | No sub-type specified |
| EmailAddress | Email address |
| EmailAddressList | Email address list |
| SearchKey | Search key |
| CategoryList | Category list |
| StringList | String list |
| DistributionList | Distribution list |
| Gender | Gender (enumGender) |
| TimeZone | Time zone (enumTimeZone) |
| Boolean | Boolean (TBD) |
| NonZeroBool | Boolean with non-zero value (enumNonZeroBool) |
| Priority | Priority |
| Sensitivity | Sensitivity (enumSensitivity) |
| Importance | Importance (enumImportance) |
| SelectedMailingAddr | Selected mailing address (enumSelectedMailingAddr) |
| TaskStatus | Task status (enumTaskStatus) |
| FlagStatus | Flag status (enumFlagStatus) |
| RecurrenceType | Recurrence type (enumRecurrenceType) |
| DayOfWeek | Day of week (enumDayOfWeek) |
| DayOfMonth | Day of month (1 through 31) |
| InstanceOfMonth | Instance of month (enumInstanceOfMonth) |
| MonthOfYear | Month of year (enumMonthOfYear) |
| BusyStatus | Busy status (enumBusyStatus) |
| AttachmentType | Attachment type (enumAttachmentType) |
| MailBodyType | Mail body type (enumMailBodyType) |
| RGB | RGB color value |
| ManagedState | Managed state (enusManagedState) |
| FaoId | FAO ID for provider |
| SpecialFolderType | Special folder type (enumSpecialFolderType) |
| ResponseState | Response state (TBD) |
| ResponseStatus | Response status (TBD) |
| JournalStatus | Journal status |
| PageStyle | Page style |
| PageNumberMethod | Page number method |
| DelegationState | Delegation state |
| MeetingStatus | Meeting status |
| MeetingInvitation | Meeting invitation |
| CalendarType | Calendar type |
| DateOnly | Date only |
| TimeOnly | Time only |
| PhoneNumber | Phone number |
| URL | URL |
| FilePath | File path |
| PopMessageID | POP message ID |
| MIMEType | MIME type |
| INVALID | All values must be below this |

Figure 18:
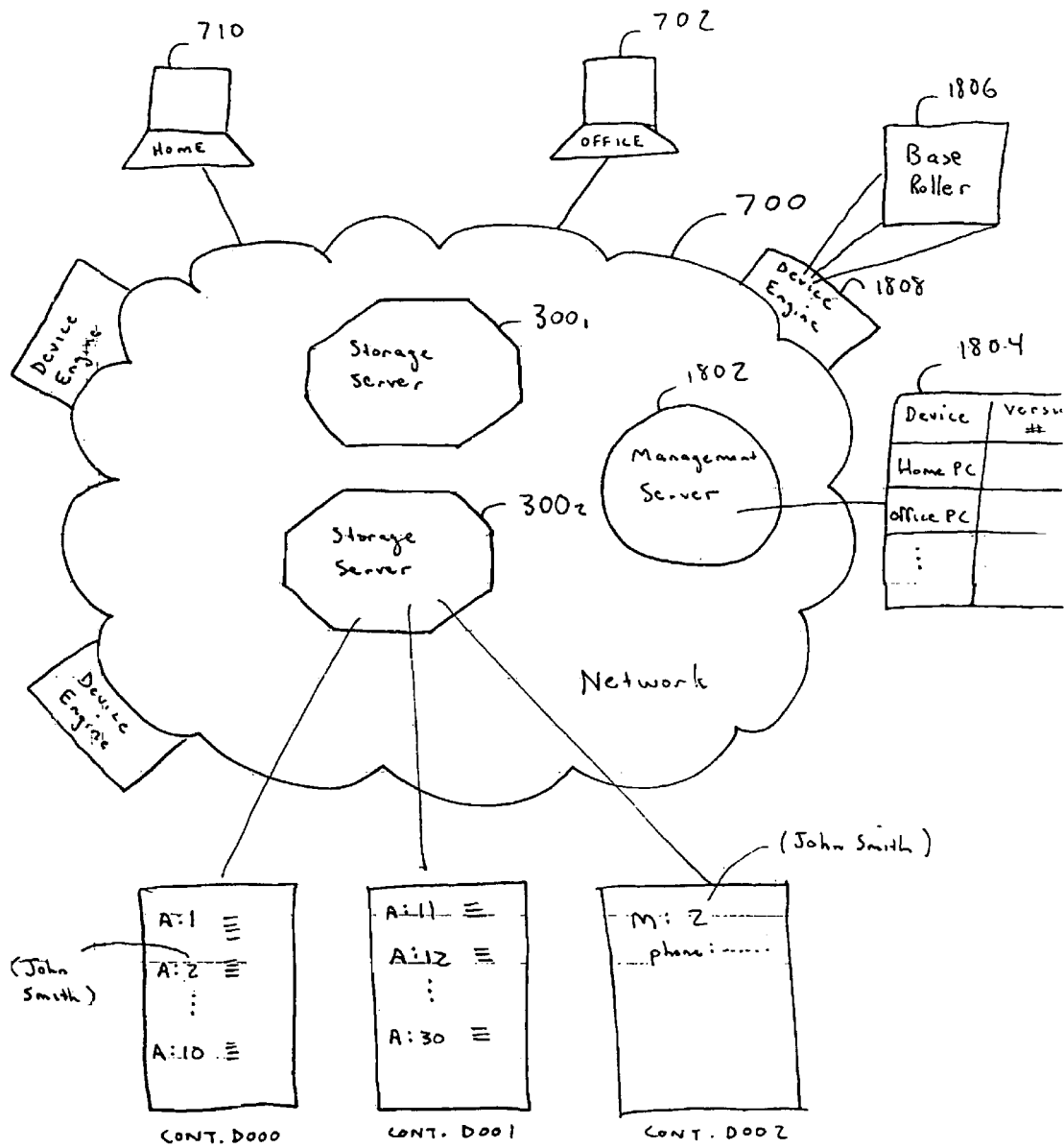
FIG. 18 is a generalized block diagram of a data transfer and synchronization system having a base rolling engine constructed in accordance with an exemplary embodiment of the present invention.

FIG. 18 is a generalized block diagram of an exemplary data transfer and synchronization system, including various components described above. In particular, the system includes network 700, as shown in FIG. 7. The network 700 includes one or more storage mediums, such as storage servers $300_1$, $300_2$, of FIG. 7. A plurality of devices, such as those shown in FIG. 7, are capable of coupling to network 700 and exchanging synchronization information in an off-line fashion, using the techniques described above. These devices include home PC 710 and office PC 702, both of which can be synchronized with one another using techniques as described above. Device engines as described above are coupled between the various devices and network 700.

In FIG. 18, client software is installed on both home PC 710 and office PC 702 and is configured to operate in conjunction with an operating system such as Microsoft Windows. The client software, when executed, interacts with the various applications on the user's PC. The user interacts with the client software and configures the software such that the applications are prioritized. Data is then extracted from the various applications, organized in a format independent of the particular application and device from which the data originated, and incorporated into a data package. With exemplary embodiments of the present invention, various classes of data are manipulated in this fashion, including contacts, bookmarks, and calendar events.

In one example, the program Microsoft Outlook is installed on home PC 710 of FIG. 18. In this example, ten contacts are programmed in Outlook. The user instructs the client software to synchronize the contacts using Outlook. The client software accesses Outlook, extracts the ten contacts, and assembles the contacts into a DataPack CONT.D000, where the UUID "CONT" identifies contact information as the specific object, and "D000" signifies that this DataPack is version "0." The contacts are combined in DataPack CONT.D000 as a collection of ten transactions, each of which is assigned a unique ID # 1, 2, . . . 10. For instance, ID2 represents a contact for John Smith. In this example, each transaction 1, 2, . . . 10 has an associated action, "Add." DataPack CONT.D000 is then uploaded to the network 700 and stored on storage server $300_2$.

Later, office PC 702 connects to the network and identifies DataPack CONT.D000. In particular, such identification includes office PC 702 sending a signal to a management server 1802, in this example, informing management server 1802 that office PC 702 has not downloaded any DataPacks for the particular data class, contacts in this example. The management server 1802 responds by sending a signal to office PC 702 indicating that a data package of change information for contacts has been stored on the server $300_2$, since the last time office PC 702 connected to network 700. Office PC 702, in response, sends a signal to management server 1802 requesting the data package. The most recent data package(s) stored on server $300_1$, are identified, in this example, version 0 of the contact data, CONT.D000. This DataPack CONT.D000 is then downloaded to office PC 702. The change information in that data package, "Adds" of contacts in this case, is then applied to the pertinent application in office PC 702. In this example, the client software on the office PC is configured to synchronize contacts using a Lotus Notes application. Thus, the ten Adds from CONT.D000 are applied to the contacts in Lotus Notes, so that the contact information in home PC 710 and office PC 702 is synchronized. The office PC 702 then sends a signal back to management server 1802 indicating that office PC 702 has applied version #0 of the contacts data package(s). This information is preferably maintained in a registry 1804 by management server 1802 for each and every device that couples to the network to download and upload change information.

Subsequently, the user of office PC 702 updates the contacts in Lotus Notes and adds one or more contacts. In this example, 20 contacts are added. Thus, the Lotus Notes application uploads a second data package to network 700, the data package including the 20 contacts and each having the associated action, "Add." This data package represents, of course, more recent change information than the information in CONT.D000. The data package uploaded by office PC 702 is identified by a unique filename, in this example, CONT.D001. In addition, office PC 702 sends a signal to management server 1802 confirming that CONT.D001 has been uploaded to network 700. The registry 1804 is updated to indicate that office PC 702 is current with, that is, has already applied the change information in, CONT.D001.

Home PC 710 subsequently connects to data network 700, and the client software on home PC 710 communicates with management server 1802 coupled to network 700. In particular, home PC sends a signal to management server 1802 identifying CONT.D000 as the most recent version of change information the last time home PC 719 coupled to data network 700. The management server 1802 queries the storage servers for any more recent data packages of changes to contact information. The management server 1802 identifies such data package(s), CONT.D001 in this example, and sends a signal to home PC 710 informing home PC that such data package(s) exist. The client software on home PC 710 then requests the new data package(s), and management server 1802 then downloads the data package(s) to home PC 710. The change information therein, in this case the 20 contacts from CONT.D001 to be added, is then applied to the contact information maintained by Microsoft Outlook on home PC 710. The communication of the change information to Microsoft Outlook and subsequent updates to the contacts in Outlook are coordinated by the client software on home PC 710. Thus, the contact information in home PC 710 and work PC 702 is again synchronized.

Other transactions, in addition to "Add," are provided with exemplary embodiments of the present invention. One of these is the transaction, "Modify." Using the present example, after CONT.D001 is uploaded to network 700, the contact information for a person sometimes change. For instance, John Smith may call the user on the telephone and tells the user that John has changed his phone number. The user then accesses office PC 710, changes the phone number for John Smith in the user's contacts.

The user then activates, for example, a "synchronize" button displayed on the computer screen by the client software, so a new data package or the change log, CONT.D002, is created and uploaded to network 700 and stored on one of storage servers $300_1$, $300_2$. A signal is sent by office PC 710 to management server 1802 informing management server 1802 that data package CONT.D002 has been uploaded. Data package CONT.D002 differs from data packages CONT.D000 and CONT.D001, in that the action, "Modify" is used instead of "Add." The Modify command and the associated change information is correlated with the particular user. In particular, the Modify instruction is associated with the pertinent ID, in this case ID #2 representing John Smith. In addition, data package CONT.D002 includes the field to be modified, in this example, "Phone," and the new information, in this example, John Smith's new phone number.

Subsequently, when home PC 702 connects to network 700, using techniques described above, the data package CONT.D002 is downloaded to home PC 702, and the client software recognizes that, for ID #2, the information within the field "Phone" has been updated. The next time home PC couples to network 700, home PC 702 sends a signal to management server indicating that home PC 702 has received CONT.D002. The modification is then made to this contact information via Microsoft Outlook. The home PC 702 then sends a confirmation signal to management server 1802, confirming that home PC 702 has received and applied the change information in version #2 of the contacts data packages. The pertinent information in the registry for home PC 702 is then updated. If no subsequent data packages with change information for contacts have been stored on the storage servers, then no data packages are downloaded to home PC 702.

As changes are made for various classes of data, data packages accumulate on the storage servers 300$_1$, 300$_2$ and consume storage space. As the number of stored data packages increases, the amount of available storage space on the storage servers decreases. In the example above, data package CONT.D000 occupies 2 kilobytes ("K"), CONT.D001 occupies 1 K, and CONT.D002 occupies 0.5 K. Thus, a total of 3.5 K of storage space on the storage servers is occupied by these three files. In situations where storage space is limited, for example, to 25 megabytes ("M"), a restriction sometimes imposed on a user's account, the amount of available storage space continues to decrease as information is updated, until storage space is no longer available for the user on the storage servers. The user may then become frustrated and generally dissatisfied with the entire data transfer and synchronization system because he can no longer store change logs.

Those both skilled and unskilled in the art will appreciate the user's frustration in the following scenario. In this example, a user has 2000 e-mails in his "In Box" of Microsoft Outlook on his home PC 702. The user desires to synchronize all of his other devices, such as office PC 710, with home PC 702. Thus, a data package MAIL.D000 is created by the client software on home PC 702 and uploaded to network 700 for storage. The data package includes all 2000 e-mails, each having an associated ID# and an associated action "Add." In this example, the data package MAIL.D000 occupies approximately 10 M of memory, for a user who has a total of 25 M allotted to his account. Recognizing this, the user issues a delete command to delete 1500 of the 2000 messages, in order to reduce the amount of occupied space. A new data package MAIL.D001 is then created, containing 1500 "Delete" actions, each associated with a particular one of the e-mail ID#'s in data package MAIL.D000. The new data package MAIL.D001 occupies an additional 1 M of memory, resulting in the occupation of even more storage space on the servers. Consequently, while the user in all events expects the amount of occupied storage space to be reduced from 10 M to about ¼ of this value, or 2.5 M, the amount actually increases to 11 M.

It is therefore desirable to collapse data packages stored on the storage servers whenever possible. Collapsing the data packages, as provided in accordance with exemplary embodiments of the present invention, generally entails combining the data packages for a particular class of data, with superfluous information being deleted. Using the example above, data packages MAIL.D000 and MAIL.D001 are combined such that the "Delete" actions in MAIL.D001 replace the "Adds" for the same ID#s in previous data package MAIL.D000, to define a new data package MAIL.D001. In an alternative example, the "Delete" command only applies to one or more fields in a given transaction. This new data package preferably overwrites the original MAIL.D001, that is, the one with only "Delete" actions. Data package MAIL.D000 is no longer relevant and, therefore, is deleted. After "rolling the base" in this fashion, only the new MAIL.D001 data package remains on the storage server, and the amount of occupied storage space is thus reduced from 10 M to approximately 2.5 M, as the user had expected.

In FIG. 18, a base rolling engine 1806, constructed in accordance with an exemplary embodiment of the present invention, is provided to achieve the desired collapsing of data packages. The base rolling engine 1806 is desirably situated within one of the device engines 1808 coupled to network 700. In one exemplary embodiment, the activation of base rolling engine 1806 is controlled by the user, while in another exemplary embodiment, the base rolling engine is activated automatically by the data transfer and synchronization system. In embodiments where the base rolling engine is manually activated, the user accesses his account via one of his devices such as home PC 702, and issues a command to compact his data. In one example, this command is executed by the user simply moving a pointer over a "Roll the Base" button displayed as part of a graphical interface on the user's display screen, and clicking on this button using a controlling device such as a mouse or trackball.

Figure 19:
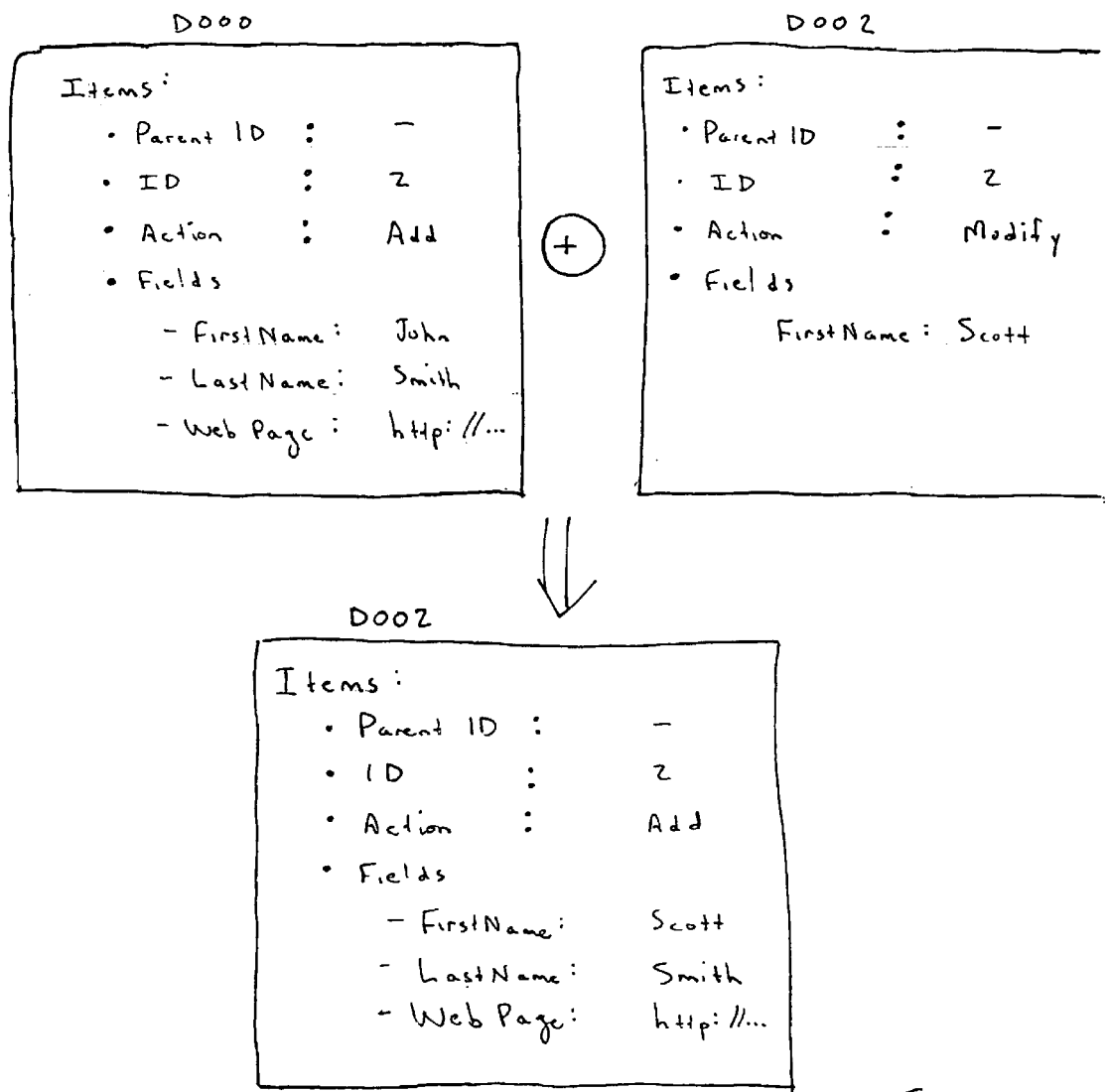
FIG. 19 is a diagram illustrating a collapsing of data packages, performed in accordance with an exemplary embodiment of the present invention.

FIG. 19 is a diagram illustrating a collapsing of data packages, performed in accordance with an exemplary embodiment of the present invention. As described above, each data package or change log is stored on a repository such as storage servers 300$_1$, 300$_2$. Within each change log are a plurality of items including, in one example, a Parent ID, an ID, an Action, and one or more Fields. The Parent ID identifies the relationship of a particular item with another item, for example, in situations where the items are related hierarchically. The ID and Action items are defined above. The fields in each data package identify what particular fields, for the class of data, are to be changed. Each field preferably has a unique numeric value and includes an attribute representing change information for the field.

In FIG. 19, there are two data packages, a base version D000 and a subsequent version D001. Both versions include the items described above and one or more fields. In particular, base version D000 has an ID of 2, an Action "Add" and three fields: "FirstName," which has the attribute "John," "LastName," having the attribute "Smith," and "Web Page," having an associated URL, "http:// . . . " Version D002 also has an ID of 2, but a change action of "Modify" rather than "Add." Version D001 only has one field, "FirstName" which has the attribute "Scott."

In FIG. 19, when the user issues a command to "roll the base," the base rolling engine determines whether version D000 and D002 have one or more of the same ID#s. In this example, because both D000 and D002 have the same ID#2, the two data packages are collapsed into one file. Specifically, a new version D002 is created, replacing the original D002 data package. The Parent ID and ID# of 2 remain the same, and the change information from D002 is applied to version D000. Specifically, the field "FirstName" that both D000 and D002 have in common is identified, and assigned the more recent attribute, "Scott" from data package D002. The Action remains "Add," and the fields "LastName" and "Web Page" remain as "Smith" and URL, "http:// . . . ," respectively, from version D000. Thus, in this example, the new D002 is essentially the same as D000, except that the field "FirstName" has been replaced with the attribute "Scott." The modification contained in original data package D002 has actually been made to data package D000, resulting in new data package D0002. The data package D000 is then deleted.

Figure 20:
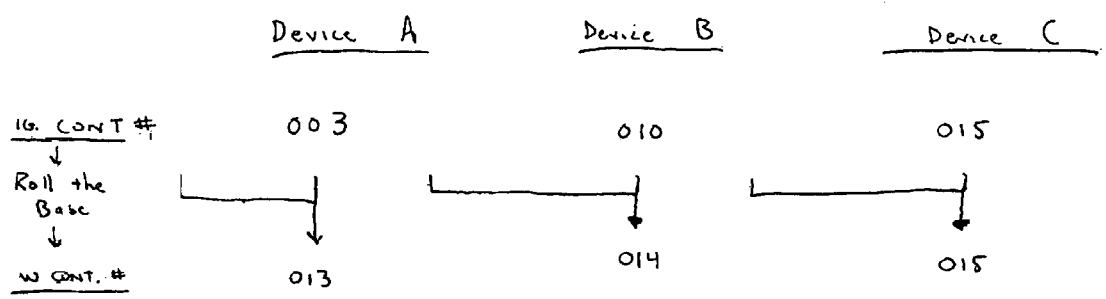
FIG. 20 is a diagram illustrating a collapsing of data packages for a plurality of devices coupled to a data network, each device having a different version of application information, performed in accordance with an exemplary embodiment of the present invention.

In another exemplary embodiment, shown in FIG. 20, three devices are capable of coupling to data network 700, namely Device A, Device B, and Device C. In one example, Device A is a palmtop computer, Device B is a home PC, and Device C is an office PC. In other examples, various other devices as described above are used for Devices A, B and C. In FIG. 20, although at least 15 different change logs for contact information have been uploaded to the data network, Devices A, B and C each have different versions of contacts. The contacts in Device A have only been updated to include changes in CONT.D003, Device B is updated to incorporate CONT.D010, and the Device C has been updated to CONT.D015. In this example, D0XX represents sequential versions of contact information; the first change log in the sequence is CONT.D000, and the 15th change log in the sequence is CONT.D015. All of these change logs are stored on storage servers coupled to the data network.

In FIG. 20, although the versions of contact information among the various devices are spread apart, that is, not in sequence, the 15 data packages stored on the storage servers are collapsed according to exemplary embodiments of the present invention. First, a plurality of bases versions are defined. In this example, the first base data package is defined by collapsing sequential data packages, as described above, starting with CONT.D000 through the version of Device A, in this example, CONT.D003. The second base data package is defined starting with version CONT.D003 of Device A, and collapsing sequential change logs through the version of Device B, in this example, CONT.D010. The third base data package is similarly defined by collapsing sequential data packages between CONT.D010 and CONT.D015. This results in three sequential base data packages, which replace data packages CONT.D013, D014, and D015. Device A is then updated to include changes to contact information up to and including new CONT.D013, Device B to CONT.D014, and Device C to version D015.

Throughout the process of defining the new base data packages, management server 1802 maintains in the registry for each device the most current version # of contact information stored in that device. In the example above, before the collapsing operating, Device A is at version 3, Device B at version 10, and Device C at version 15. The base rolling engine is in communication with management server 1802, so that when the data packages are collapsed, the base rolling engine requests and receives device information for the particular user from management server 1802. This includes information identifying all of the devices registered by the user, and what is the most current version of the data class stored in each device.

Thus, after the collapsing operation, when Device B is to be synchronized, management server recognizes that Device B is at version 14, so only data package CONT.D015 needs to be downloaded to Device B. Similarly, when Device A couples to the network to be synchronized, the change information in CONT.D014 is first applied, then CONT.D015. These updates are all achieved using the techniques described above.

Performing one or two updates during the time a device couples to the network is computationally less complex and, therefore, faster than performing an entire sequence of updates. This is due to the fact that for every file that is downloaded, a communications channel must be established, the file downloaded, and then the channel closed. There is high overhead associated with this opening and closing connections. The more times this iteration is performed, the more time is monopolized, resulting in higher costs. In the example above, without rolling the base as described to bring Device A current to version #13 information, 12 updates would need to be performed to update Device A from version #3 to version #15. Using the example above, with 12 files, a connection must be opened, file downloaded, and connection closed, 12 times. With 3 files, this iteration need only be performed 3 times. Fewer data packages are sent from the network to Device A and, therefore, less data. This, in turn, results in less processing by Device A and improved efficiency.

The aforementioned exemplary embodiments of the present invention provide a user-centric model of communication to deliver personal information via network services. This model accommodates devices that are disconnected from the network, such as the Internet, at various times. Personal information can continue to exist locally rather than imposing a server-centric model on existing information.

In accordance with the foregoing, a store and forward information broadcast is utilized. Changes to existing information are replicated to an Internet storage server and changes are then retrieved by other devices on the network at device-specific times. In this manner, direct client communication is accomplished without requiring one-to-one communication. While one communication is supported by the system of the present invention, it need not be required.

Although the present invention has been presented in the form of an Internet store and forward broadcast for the purposes of synchronizing personal information amongst various types of devices, it will be readily recognized that synchronization need not be accomplished as the only application for the aforementioned system. In particular, the system can be utilized to efficiently broadcast changes to information in so-called "push" type information applications where only portions of the data need to be changed on a client application. For example, in a system where information such as changes in a stock price need to be broadcast to a plurality of users, a client application implementing the aforementioned technology can be updated by only changing specific portions of the data in the client application relative to that particular stock price. This can be done using a smaller bandwidth than has previously been determined with other devices.

It should be understood that the exemplary embodiments described above are only illustrative of the principles of the present invention. Additional variations will be apparent to those skilled in the art and, therefore, can be made without departing from the scope and spirit of the invention. Thus, the invention is not limited to the particular details described above. Rather, it is intended that the claims below cover all such variations and modifications as are within the scope and spirit of the invention.

What is claimed is:

1. A computer implemented method of collapsing data packages stored in a data transfer and synchronization system, the method comprising:

providing a first data package having a first transaction including an identification number, an action, and a plurality of fields each with an attribute representing change information;

providing a second data package having a second transaction made subsequent to the first transaction, the second transaction having an identification number, an action, and a field with an attribute;

determining whether the identification number of the second transaction corresponds to the identification number of the first transaction;

determining whether the field of the second transaction corresponds to one of the fields of the first transaction;

combining, when the identification numbers of the first and second transactions correspond to one another and the field of the second transaction corresponds to one of the fields of the first transaction, the first and second data packages to define a combined data package having a combined transaction with the identification number; and replacing the second data package with the combined data package.

2. The method of claim 1 further comprising:
deleting the first data package.

3. The method of collapsing data packages of claim 1, wherein combining the first and second data packages comprises:
determining the type of action of the second transaction;
defining, when the action of the second transaction is "Add," the combined transaction to include an "Add" action and the corresponding field and the attribute of the second transaction;
defining, when the action of the second transaction is "modify," the combined transaction to include an "add" action and the corresponding field and the attribute of the second transaction; and
defining, when the action of the second transaction is "delete," the combined transaction to include a "delete" action and the corresponding field.

4. A computer implemented method of collapsing data packages stored in a data transfer and synchronization system, the method comprising:
providing a first data package having a plurality of first transactions each including an identification number, an action, and a plurality of fields each with an attribute representing change information;
providing a second data package having a second transaction made subsequent to the first transactions, the second transaction having an identification number, an action, and a field with an attribute;
determining whether the identification number of the second transaction corresponds to one of the identification numbers of the first transactions;
identifying, when the identification number of the second transaction corresponds to the one of the identification numbers of the first transactions, the one first transaction;
determining whether the field of the second transaction corresponds to one of the fields of the identified first transaction;
combining, when the identification numbers of the second transaction and the identified first transaction correspond to one another and the field of the second transaction corresponds to one of the fields of the identified first transaction, the first and second data packages to define a combined data package having a combined transaction with the identification number; and
replacing the second data package with the combined data package.

5. A method as defined in claim 4 wherein each data package includes an instruction to change data, and an identification number.

6. A method as defined in claim 4 wherein said at one of the first, second data packages was created later in time than another of said respective first, second and third plurality of data packages.

7. A computer implemented system coupled to a network, comprising:
code for tracking receipt of at least a first and a second data package file, each file including an instruction to change data, and an identification number, wherein said at least second data package file was created later in time than the first data package file to a storage device coupled to the network;
a base rolling engine including code operable to instruct a processing device to:
determine whether the identification number of the second file corresponds to the identification number of the first,
determine whether the data of the second file corresponds to the data of the first file;
combine the first and second files when the identification numbers of the first and second file correspond to one another and the data of the second file corresponds to the data of the first file; and
replace the second data package file with the combined data package.

8. The system of claim 7, wherein the first and second data packages to define a combined data package having a combined transaction with the identification number.

9. The system of claim 7 wherein said base rolling engine includes code to delete the first data package upon combining of the first and second files.

10. The system of claim 7, wherein said code to combine the first and second data package files comprises code for instructing the processor to perform the steps of:
determining the type of instruction;
defining, when the action of the second file instruction is "Add," the combined transaction to include an "Add" action and a corresponding field and the attribute of the second file;
defining, when the action of the second file is "modify," the combined transaction to include an "add" action and the corresponding field and the attribute of the second file; and
defining, when the action of the second file is "delete," the combined transaction to include a "delete" action and the corresponding field.

11. The system of claim 7, wherein each said data package includes data from a device coupled to the network and the data package file is transmitted to the storage device.

12. The system of claim 7, wherein further including at least a third and a fourth data package files, wherein the first and second data package files included data from a first device having a data store coupled to the network and the third and fourth data package files include data from a second device having a data store coupled to the network.

13. The system of claim 7, wherein each data package includes an instruction to alter contact information defined by a user.

14. The system of claim 7, wherein each data package further includes at least one data field including change information for the data.

* * * * *